United States Patent
Konishi et al.

(10) Patent No.: US 10,867,222 B2
(45) Date of Patent: Dec. 15, 2020

(54) PRINTED OBJECT MANAGEMENT APPARATUS AND MANAGEMENT METHOD

(71) Applicant: KOMORI CORPORATION, Tokyo (JP)

(72) Inventors: Takahiro Konishi, Tsukuba (JP); Katsuharu Miyazaki, Tsukuba (JP); Tomoyuki Morono, Tsukuba (JP)

(73) Assignee: KOMORI CORPORATION, Tokyo (JP)

( * ) Notice: Subject to any disclaimer, the term of this patent is extended or adjusted under 35 U.S.C. 154(b) by 0 days.

(21) Appl. No.: 16/337,322

(22) PCT Filed: Sep. 4, 2017

(86) PCT No.: PCT/JP2017/031709
§ 371 (c)(1),
(2) Date: Mar. 27, 2019

(87) PCT Pub. No.: WO2018/061625
PCT Pub. Date: Apr. 5, 2018

(65) Prior Publication Data
US 2020/0034672 A1    Jan. 30, 2020

(30) Foreign Application Priority Data

Sep. 30, 2016 (JP) ................. 2016-193741

(51) Int. Cl.
*H04N 1/46* (2006.01)
*G06K 15/02* (2006.01)
*G06T 7/00* (2017.01)

(52) U.S. Cl.
CPC ....... *G06K 15/027* (2013.01); *G06K 15/1872* (2013.01); *G06T 7/0004* (2013.01); *G06T 2207/30144* (2013.01)

(58) Field of Classification Search
None
See application file for complete search history.

(56) References Cited

U.S. PATENT DOCUMENTS 5,187,376 A    2/1993  Hashimoto et al.
8,687,221 B1*  4/2014  Bergmans ............ H04N 1/6036
                                              358/1.13
(Continued)

FOREIGN PATENT DOCUMENTS

CN    102529451 A       7/2012
DE    102007020511 A1  11/2007
(Continued)

OTHER PUBLICATIONS

International Search Report for PCT/JP2017/031709 (PCT/ISA/210) dated Nov. 14, 2017.
(Continued)

*Primary Examiner* — Dung D Tran
(74) *Attorney, Agent, or Firm* — Birch, Stewart, Kolasch & Birch, LLP

(57) ABSTRACT

A printed object management apparatus (10) is provided with: a line sensor (11); a spectrophotometer (12); an area camera (13); a print quality-inspecting unit (10A) for inspecting the quality of the overall pattern of a printed object (9) on the basis of data input from the line sensor (11); a print density controlling unit (10B) for controlling, on the basis of data input from the spectrophotometer (12), the amount of ink supplied so that the ink density equals the reference density; and an inter-color registering unit (10C) for detecting register marks printed on the printed object (9) on the basis of data input from the area camera (13) and aligning the patterns between the various colors. The appa- (Continued)

ratus is configured so as to support the line sensor (11), the spectrophotometer (12) and the area camera (13) on a single scanning head (10b).

2 Claims, 24 Drawing Sheets

(56) References Cited

U.S. PATENT DOCUMENTS

| | | | |
|---|---|---|---|
| 2008/0087114 A1 | 4/2008 | Engler et al. | |
| 2012/0194593 A1* | 8/2012 | Kurata | B41F 33/0045 |
| | | | 347/15 |
| 2014/0002842 A1* | 1/2014 | Ito | G06K 9/00442 |
| | | | 358/1.13 |
| 2014/0093139 A1* | 4/2014 | Yamagishi | H04N 1/00034 |
| | | | 382/112 |
| 2015/0350493 A1* | 12/2015 | Sakatani | H04N 1/6052 |
| | | | 358/504 |
| 2016/0044211 A1* | 2/2016 | Yamaguchi | H04N 1/6072 |
| | | | 358/2.1 |

FOREIGN PATENT DOCUMENTS

| | | |
|---|---|---|
| DE | 102007030571 A1 | 2/2008 |
| JP | H01-218835 A | 9/1989 |
| JP | 2012-081617 A | 4/2012 |
| JP | 2013-075518 A | 4/2013 |

OTHER PUBLICATIONS

Chinese Office Action of CN 201780058609.6 dated Aug. 4, 2020 with English translation.
Extended European Search Report issued in counterpart European Application No. 17855583.5, dated Oct. 12, 2020.

* cited by examiner

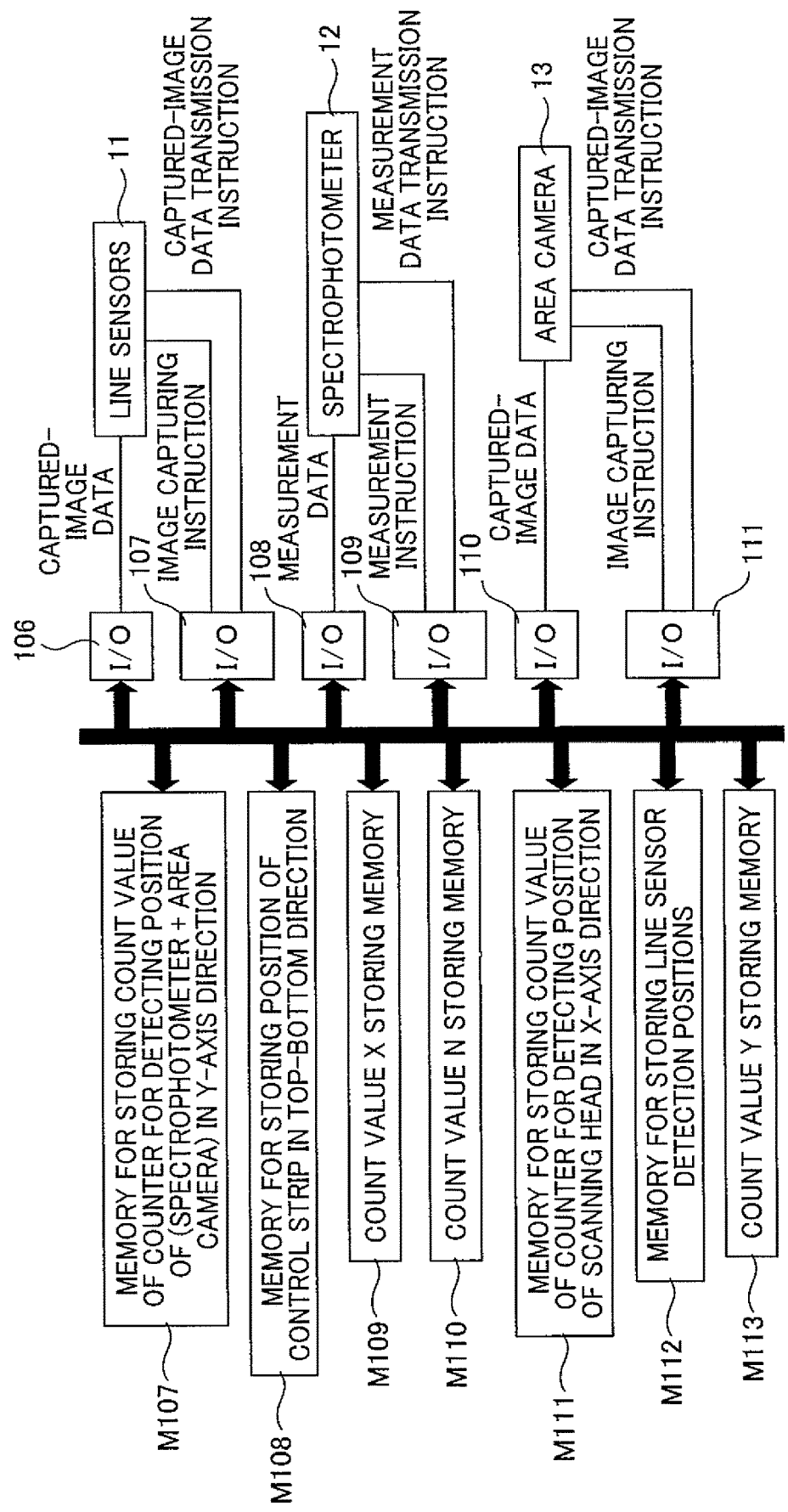

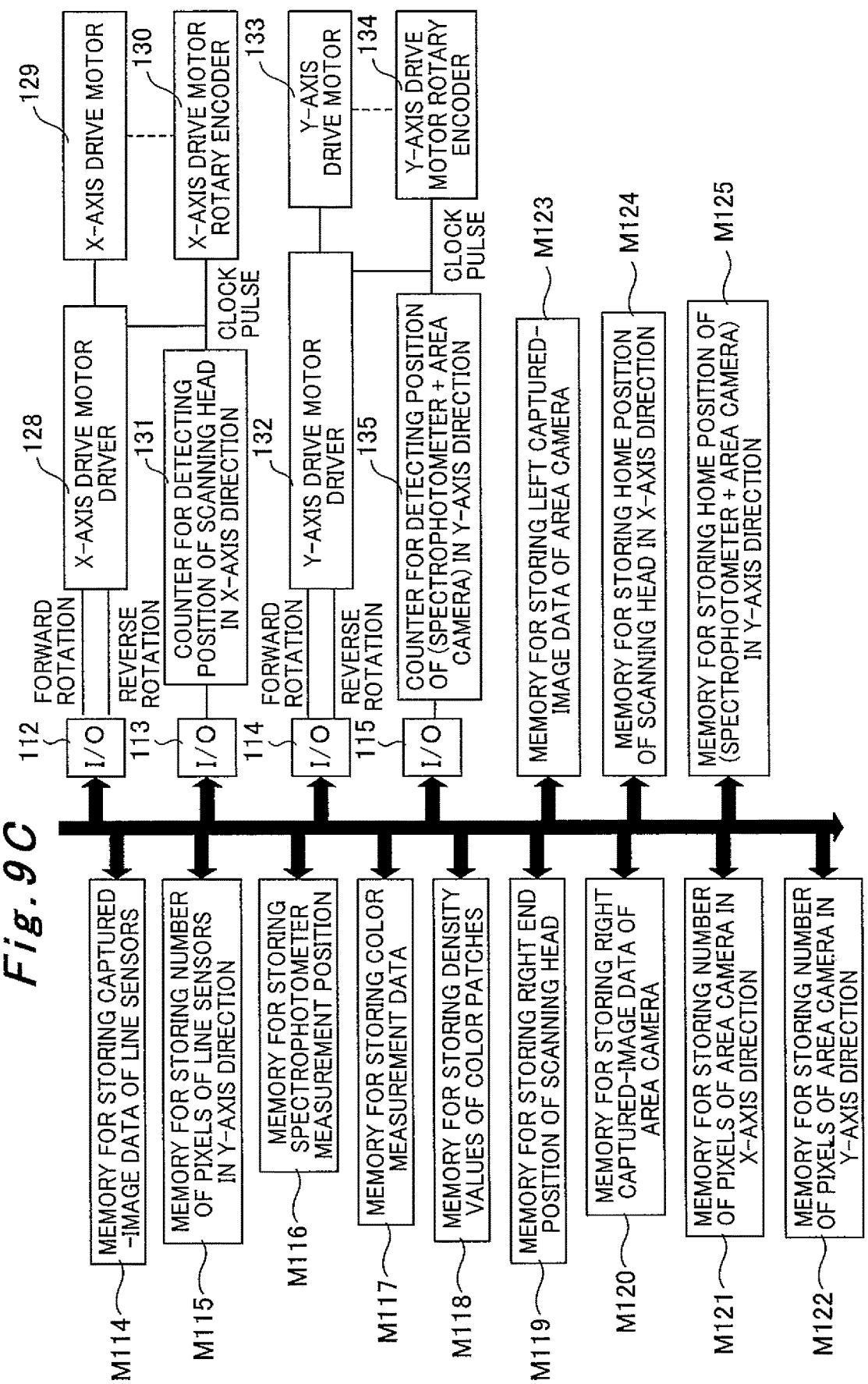

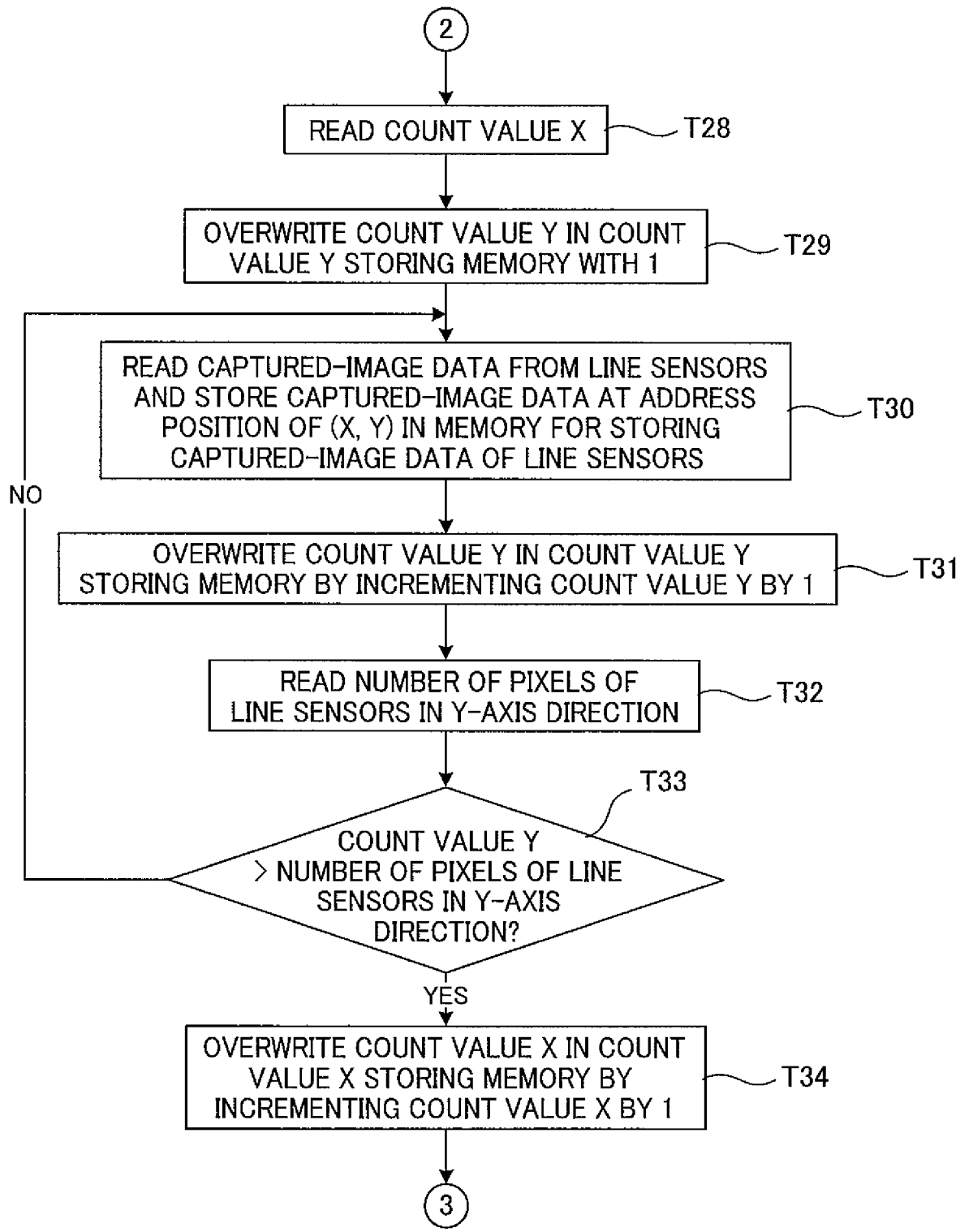

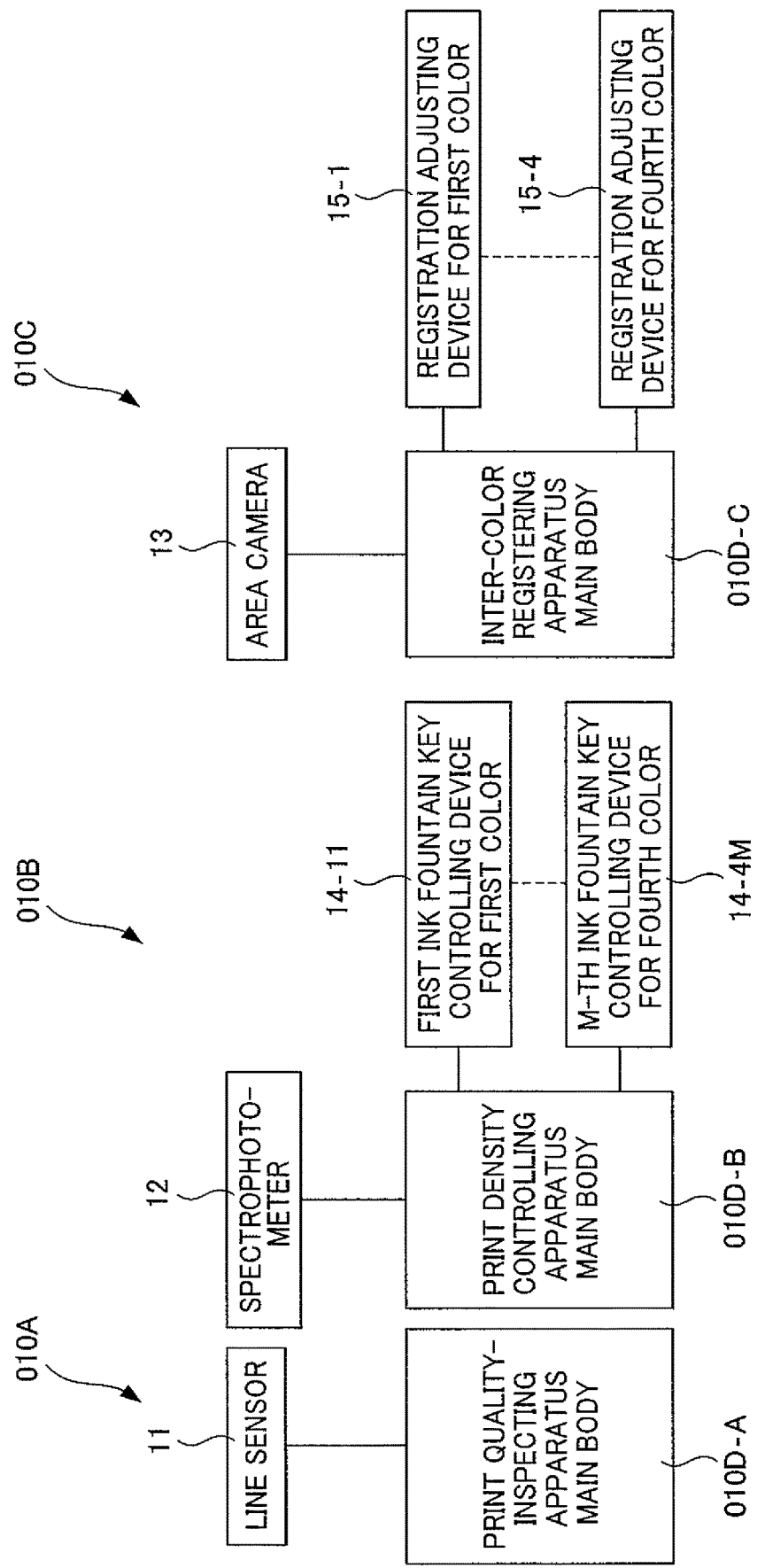

PRINTED OBJECT MANAGEMENT APPARATUS AND MANAGEMENT METHOD

TECHNICAL FIELD

The present invention relates to printed object management apparatus and management method.

BACKGROUND ART

Management of a printed object conventionally includes three types of management, namely: print quality inspection in which quality of a printed pattern is inspected; color tone (print density) management in which an ink density of the printed pattern is measured and an ink supply amount is controlled such that the ink density becomes equal to a reference density; and inter-color registration in which patterns of various colors are aligned with one another. For example, as illustrated in FIG. 15, these three types of management are performed by using: a print quality-inspecting apparatus 010A including a line sensor 11 and a print quality-inspecting apparatus main body 010D-A; a print density controlling apparatus 010B including a spectrophotometer 12, a print density controlling apparatus main body 010D-B, and a first ink fountain key controlling device 14-11 for the first color to a M-th ink fountain key controlling device 14-4M for the fourth color; and an inter-color registering apparatus 010C including an area camera 13, an inter-color registering apparatus main body 010D-C, and a registration adjusting device 15-1 for the first color to a registration adjusting device 15-4 for the fourth color.

However, in the conventional structure as illustrated in FIG. 15, the apparatuses are operated one by one such that, for example, first, the print quality-inspecting apparatus 010A detects the overall pattern and inspects the quality of the printed pattern, then the print density controlling apparatus 010B measures the density of each of color patches in a control strip and adjusts the ink supply amount, and lastly, the inter-color registering apparatus 010C performs inter-color registration of detecting register marks and aligning the patterns of the respective colors with one another. Accordingly, the conventional structure has a problem that it takes a long time to perform all of measurement, inspection, and control operations.

Moreover, the conventional apparatuses also have problems that the equipment cost is high because the detectors (line sensors 11, spectrophotometer 12, and area camera 13 in the example illustrated in FIG. 15) and the apparatus main bodies (print quality-inspecting apparatus main body 010D-A, print density controlling apparatus main body 010D-B, and inter-color registering apparatus main body 010D-C in the example illustrated in FIG. 15) are separately provided.

As an apparatus which can compensate for the aforementioned shortcomings, Patent Document 1 listed below discloses a technique in which a measuring device (spectrophotometer) of a print density controlling apparatus and a detection device (area camera) of an inter-color registering apparatus are provided in one scanning head and a common control device performs measurement and control.

Moreover, Patent Document 2 listed below discloses an apparatus which obtains (a formula for converting RGB output to density values of various colors) by using RGB output of solid patches of the respective colors in a control strip obtained by a detection device (color camera) of a print quality-inspecting apparatus and density values of the respective colors obtained by a measuring device (density meter) of a print density controlling apparatus and which then obtains density values of the solid patches of the respective colors from data of an image captured by the color camera of the print quality-inspecting apparatus by using this conversion formula.

PRIOR ART DOCUMENT

Patent Document

Patent Document 1: Japanese Patent Application Publication No. 2012-81617
Patent Document 2: Japanese Patent Application Publication No. 2013-75518

SUMMARY OF THE INVENTION

Problems to be Solved by the Invention

However, in the configuration described in Patent Document 1, the print quality-inspecting apparatus is provided as a completely separate apparatus and, in the configuration described in Patent Document 2, the inter-color registering apparatus is provided as a completely separate apparatus. Thus, the problem that it takes a long time to perform all of measurement, inspection, and control operations and the problem of high equipment cost are not completely solved.

Moreover, in the configuration described in Patent Document 2, since the conversion from the RGB output to the density values of the respective colors is performed by using the conversion formula, the technique of Patent Document 2 has a problem that an error inevitably occurs to a certain degree.

In view of this, an object of the present invention is to provide printed object management apparatus and management method which can perform print quality inspection, color tone management, and inter-color registration in short time, with high accuracy, at low cost.

Means for Solving the Problems

A printed object management apparatus according to a first aspect of the invention to solve the above problem includes:
a first detector configured to detect an overall pattern of a printed object;
a measuring device configured to measure an ink density of the printed object;
a second detector configured to detect a portion of the pattern of the printed object;
a print quality-inspecting unit configured to inspect quality of the overall pattern of the printed object based on data received from the first detector;
a print density controlling unit configured to control an ink supply amount based on data received from the measuring device such that the ink density becomes equal to a reference density; and
an inter-color registering unit configured to detect a register mark printed on the printed object based on data received from the second detector and align patterns of various colors with one another, characterized in that
the first detector, the measuring device, and the second detector are supported on one scanning head.

The printed object management apparatus according to a second aspect of the invention to solve the above problem is characterized in that
the scanning head is supported to be movable in a left-right direction, the first detector is fixedly supported on the scanning head, and the measuring device and the second detector are supported on the scanning head to be movable in a top-bottom direction.

The printed object management apparatus according to a third aspect of the invention to solve the above problem is characterized in that the printed object management apparatus further includes:

a first driving device configured to move the scanning head in the left-right direction;

a supporting body supporting the measuring device and the second detector; and a second driving device configured to move the supporting body in the top-bottom direction in the scanning head.

The printed object management apparatus according to a fourth aspect of the invention to solve the above problem is characterized in that the printed object management apparatus further comprises a controller configured to control the first driving device, the second driving device, the first detector, the measuring device, and the second detector such that, when the scanning head is moved from one side to the other side in the left-right direction, the first detector detects the overall pattern of the printed object and the measuring device measures the ink density of the printed object and, when the scanning head is moved back from the other side to the one side in the left-right direction, the second detector detects the register mark.

A printed object management method according to a fifth aspect of the invention to solve the above problem includes:

print quality inspection processing of inspecting quality of an overall pattern of a printed object based on data received from a first detector configured to detect the overall pattern of the printed object;

print density control processing of controlling an ink supply amount based on data received from a measuring device configured to measure an ink density of the printed object such that the ink density becomes equal to a reference density; and inter-color registration processing of detecting a register mark printed on the printed object based on data received from a second detector configured to detect a portion of the pattern of the printed object and aligning patterns of various colors with one another, characterized in that the first detector, the measuring device, and the second detector are supported on one scanning head.

The printed object management method according to a sixth aspect of the invention to solve the above problem is characterized in that the scanning head is supported to be movable in a left-right direction, the first detector is fixedly supported on the scanning head, and the measuring device and the second detector are supported on the scanning head to be movable in a top-bottom direction.

The printed object management method according to a seventh aspect of the invention to solve the above problem is characterized in that the scanning head is moved in the left-right direction by a first driving device, the measuring device and the second detector are supported by a supporting body, and the supporting body is moved in the top-bottom direction in the scanning head by a second driving device.

The printed object management method according to an eight aspect of the invention to solve the above problem is characterized in that the first driving device, the second driving device, the first detector, the measuring device, and the second detector are controlled such that, when the scanning head is moved from one side to the other side in the left-right direction, the first detector detects the overall pattern of the printed object and the measuring device measures the ink density of the printed object and, when the scanning head is moved back from the other side to the one side in the left-right direction, the second detector detects the register mark.

Effect of the Invention

The printed object management apparatus and management method according to the present invention can perform print quality inspection, color tone management, and inter-color registration in short time, with high accuracy, at low cost.

BRIEF DESCRIPTION OF THE DRAWINGS

FIG. 9B is a block diagram illustrating the configuration of the printed object management apparatus main body according to one embodiment of the present invention.

FIG. 9C is a block diagram illustrating the configuration of the printed object management apparatus main body according to one embodiment of the present invention.

FIG. 12B is a flowchart illustrating the flow of processing performed by the printed object management apparatus main body according to one embodiment of the present invention.

FIG. 15 is a block diagram illustrating one structural example of a conventional printed object management apparatus.

MODE FOR CARRYING OUT THE INVENTION

An embodiment of the present invention is described below in detail based on the drawings.

Figure 1:
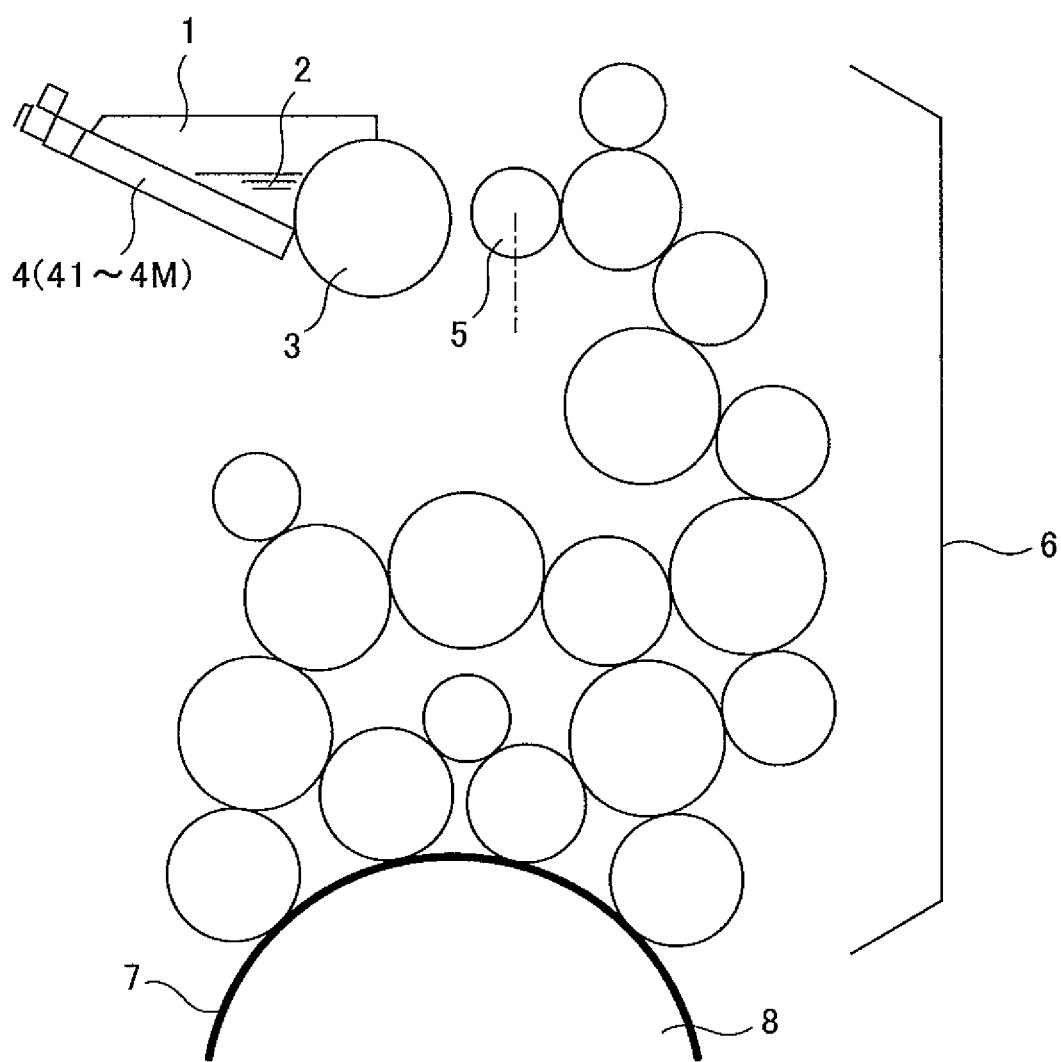
FIG. 1 is a view illustrating a main portion of an inking device (inker) in a printing unit of each color in a printing press.

FIG. 1 illustrates a main portion of an inking device (inker) in a printing unit for each color in a printing press. In FIG. 1, reference numeral 1 denotes an ink fountain, 2 denotes ink stored in the ink fountain 1, 3 denotes an ink fountain roller, 4 (41 to 4M) denotes multiple ink fountain keys provided parallel to each other in the axial direction of the ink fountain roller 3, 5 denotes ink ductor roller, 6 denotes an ink roller group, 7 denotes a printing plate attached to a plate cylinder 8. A pattern is printed on the printing plate 7.

In the inking device, the ink 2 in the ink fountain 1 is supplied from a space between the ink fountain keys 41 to 4M and the ink fountain roller 3 to the ink fountain roller 3, and a feeding operation of the ink ductor roller 5 causes the ink supplied to the ink fountain roller 3 to be supplied to the printing plate 7 via the ink roller group 6. The ink supplied to the printing plate 7 is printed on a print sheet via a not-illustrated blanket cylinder.

Figure 2:
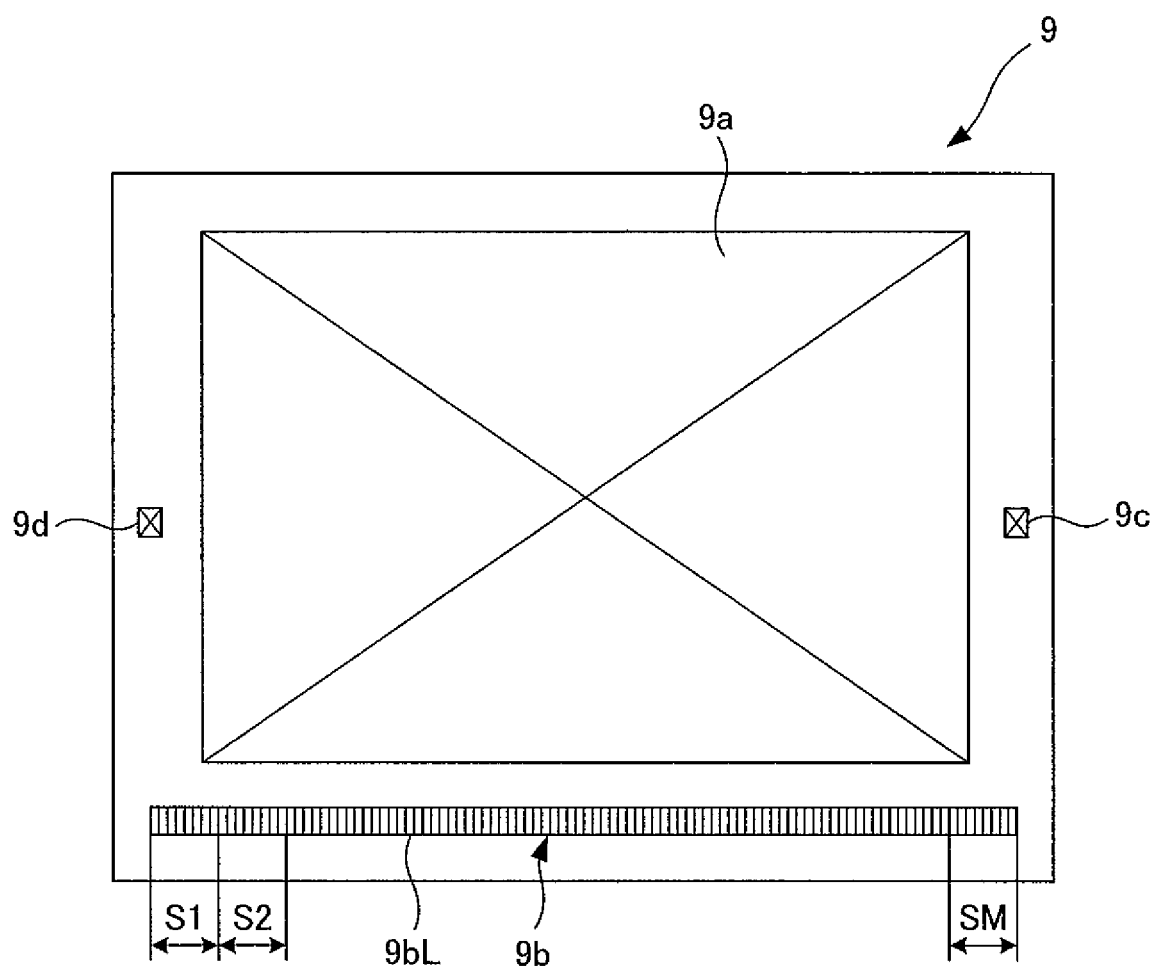
FIG. 2 illustrates an example of a printed object printed by the printing press.

Then, as illustrated in FIG. 2, a strip-shaped control strip 9b is printed in a margin in a printed object 9 to extend in a left-right direction, the margin being a portion other than a pattern region 9a. FIG. 2 illustrates an example in which the control strip 9b is printed in a margin on the bottom side (sheet trailing edge side) of the printed object 9.

In the case of general four-color printing, the control strip 9b is formed of regions S1 to SM including color patches (solid patches with a dot area percentage of 100%) 9bL (L=1 to n) used to measure densities of colors including black (K), cyan (C), magenta (M), and yellow (Y). The regions S1 to SM correspond to key zones of the ink fountain keys 41 to 4M in the printing unit of each color in the printing press. In the embodiment, the printing press performs general four-color printing.

Moreover, register marks 9c, 9d are printed in margins of the printed object 9. FIG. 2 illustrates an example in which the first register mark 9c is printed in a center portion, in a top-bottom direction, of a right margin and the second register mark 9d is printed in a center portion, in the top-bottom direction, of a left margin.

Figure 3:
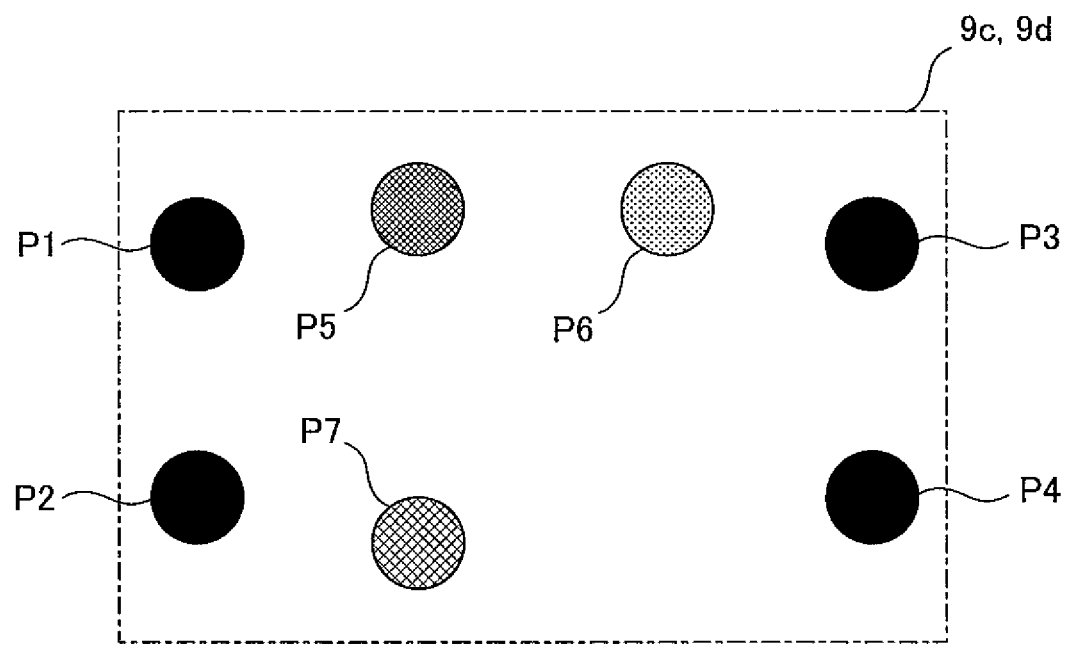
FIG. 3 is a view illustrating an example of register marks printed in margins of the printed object.

As illustrated in FIG. 3, each of the register marks 9c, 9d includes black (K) register marks including four spot-shaped marks P1 to P4, a cyan (C) register mark including one spot-shaped mark 25, a magenta (M) register mark including one spot-shaped mark P6, and a yellow (Y) register mark including one spot-shaped mark P7. Note that, since such spot-shaped register marks are already known, detailed description thereof is omitted herein.

Figure 4:
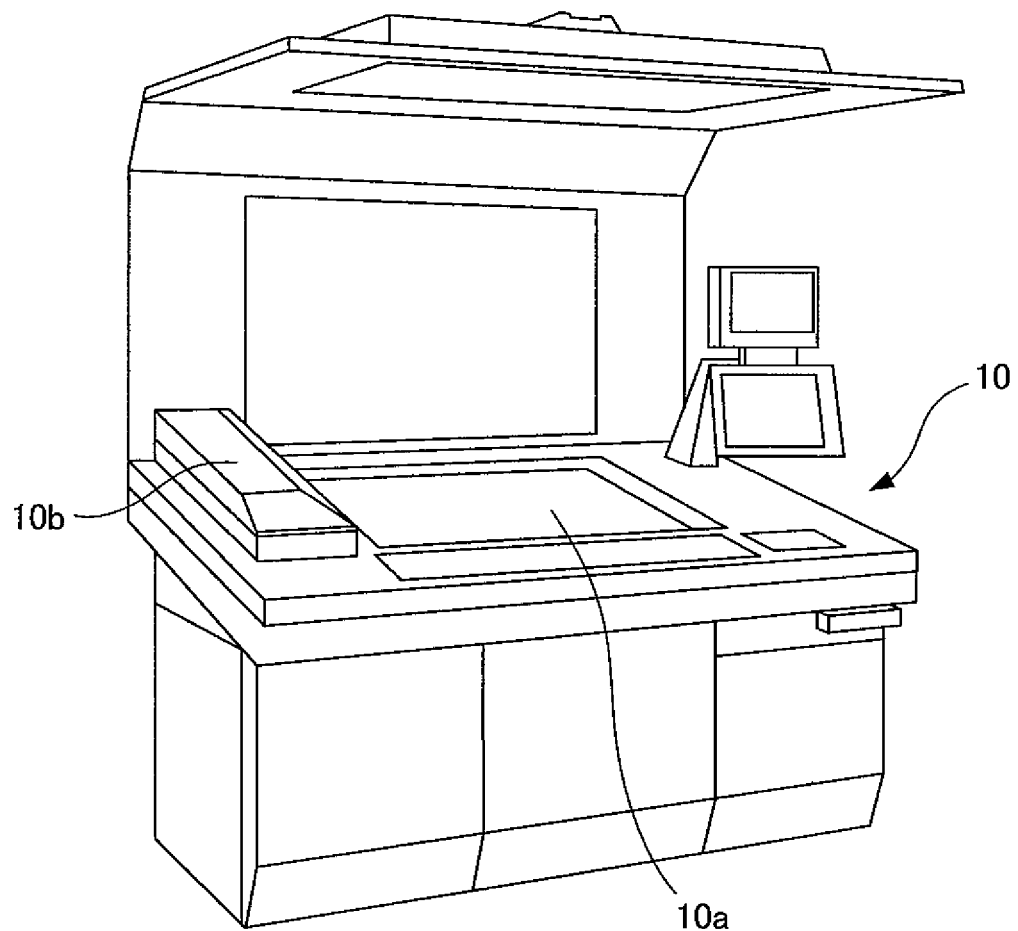
FIG. 4 is an exterior view of a printed object management apparatus.
Figure 5:
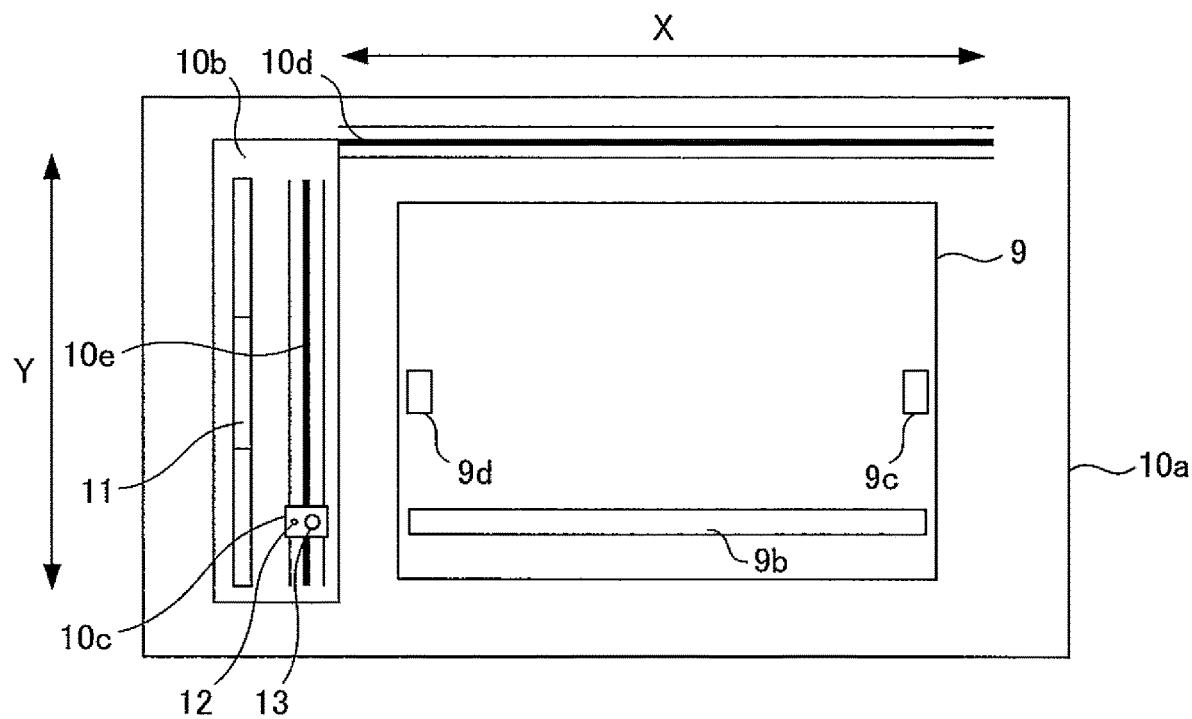
FIG. 5 is a plan view illustrating a state where the printed object is set on a stage of the printed object management apparatus and movement directions (X-axis direction (left-right direction), Y-axis direction (top-bottom direction)) of a scanning head which moves on the stage.
Figure 6:
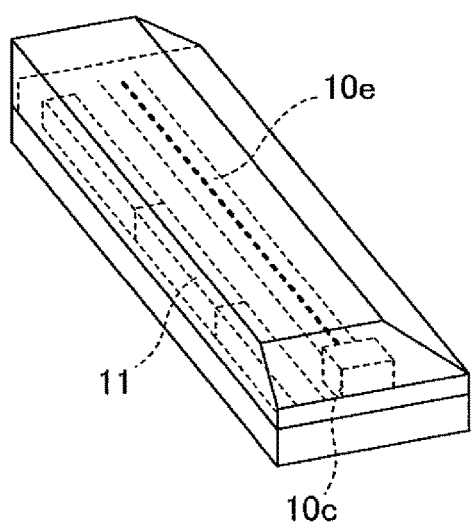
FIG. 6 is an exterior view of the scanning head.

As illustrated in FIGS. 4 to 6, a printed object management apparatus (scanner) 10 includes a stage 10a having an upper surface on which the printed object 9 is to be set and a scanning head 10b configured to move on the stage 10a. The printed object 9 is set on the stage 10a such that the left-right direction and the top-bottom direction of the printed object 9 are aligned with an X-axis direction and a Y-axis direction, respectively.

The scanning head 10b can be moved in the X-axis direction by an X-axis drive mechanism 10d on the upper surface of the stage 10a and supports line sensors 11, a spectrophotometer 12, and an area camera 13 including a color camera and the like.

The line sensors 11 are detectors (first detectors) for detecting the overall pattern printed on the printed object 9. In the embodiment, three line sensors 11 are fixedly supported on the scanning head 10b to be aligned in the Y-axis direction. A region to be imaged by the three line sensors 11 in the top-bottom direction is a region including at least the pattern region 9a and the control strip 9b of the printed object 9.

The spectrophotometer 12 is a detector (measuring device) for measuring density values of the respective color patches 9bL of the various colors in the control strip 9b printed on the printed object 9.

The area camera 13 is a detector (second detector) for detecting the register marks of the various colors in the register marks 9c, 9d and also serves as a detector for detecting the position of the control strip 9b in the top-bottom direction. The width of an image capturing region of the area camera 13 in the top-bottom direction is greater than the length of the control strip 9b and the length of the register marks 9c, 9d in the top-bottom direction.

The spectrophotometer 12 and the area camera 13 are supported on the scanning head 10b via a supporting body 10c. The supporting body 10c can be moved in the Y-axis direction in the scanning head 10b by a Y-axis drive mechanism 10e. Specifically, the spectrophotometer 12 and the area camera 13 can be moved in the X-axis direction and the Y-axis direction on the stage 10a by using the X-axis drive mechanism 10d and the Y-axis drive mechanism 10e as driving devices. Note that, in the embodiment, the area camera 13 is disposed on the right side of the spectrophotometer 12.

Figure 7:
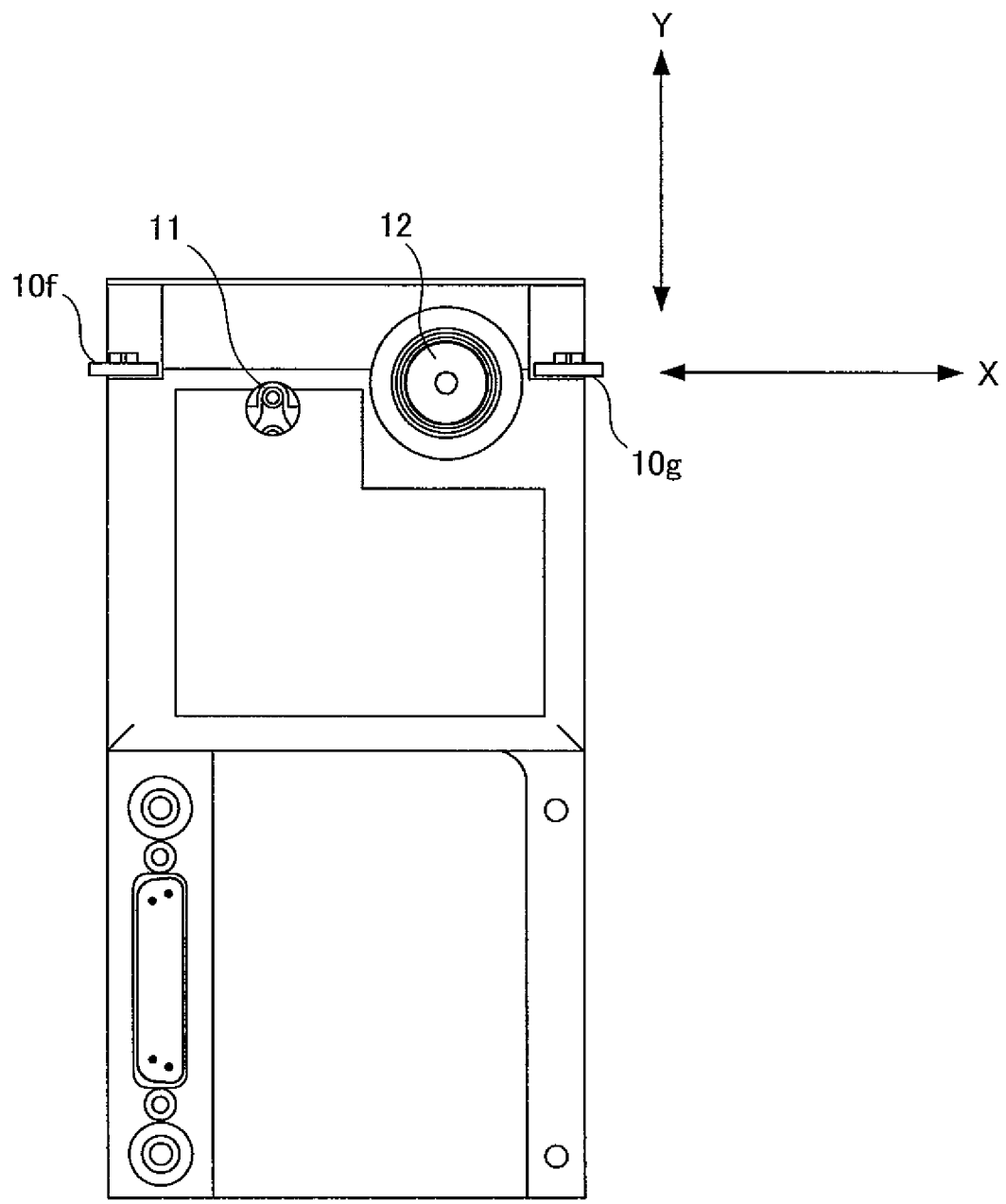
FIG. 7 is a bottom view of a supporting body.

As illustrated in FIG. 7, rollers 10f, 10g for guiding the movement of the supporting body 10c in the X-axis direction are provided on a bottom surface of the supporting body 10c. When the density values of the respective color patches of the various colors in the control strip 9b are to be measured or the positions of the register marks of the various colors in the register marks 9c, 9d are to be detected, the supporting body 10c is lowered such that the rollers 10f, 10g land on the upper surface of the stage 10a.

Figure 8:
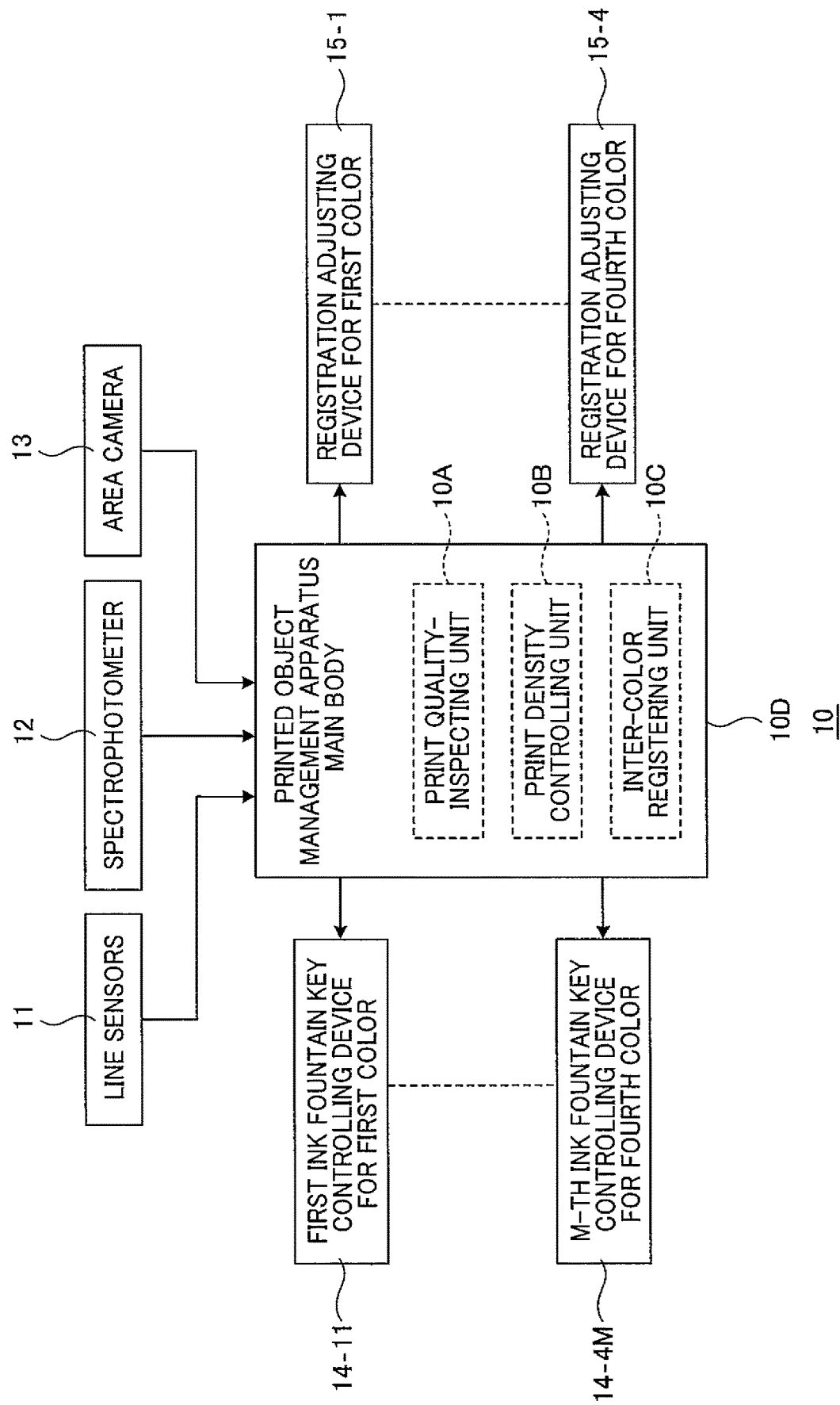
FIG. 8 is a block diagram illustrating a configuration of the printed object management apparatus according to one embodiment of the present invention.

As illustrated in FIG. 8, the printed object management apparatus 10 further includes: a printed object management apparatus main body 10D which is a controller including a print quality-inspecting unit 10A, a print density controlling unit 10B, and an inter-color registering unit 10C; a first ink fountain key controlling device 14-11 for the first color to a M-th ink fountain key controlling device 14-4M for the fourth color which control ink supply amounts based on data received from the spectrophotometer 12 such that the ink density of each color becomes equal to a reference density; and a registration adjusting device 15-1 for the first color to a registration adjusting device 15-4 for the fourth color which perform alignment between the colors based on data received from the area camera 13.

Figure 9A:
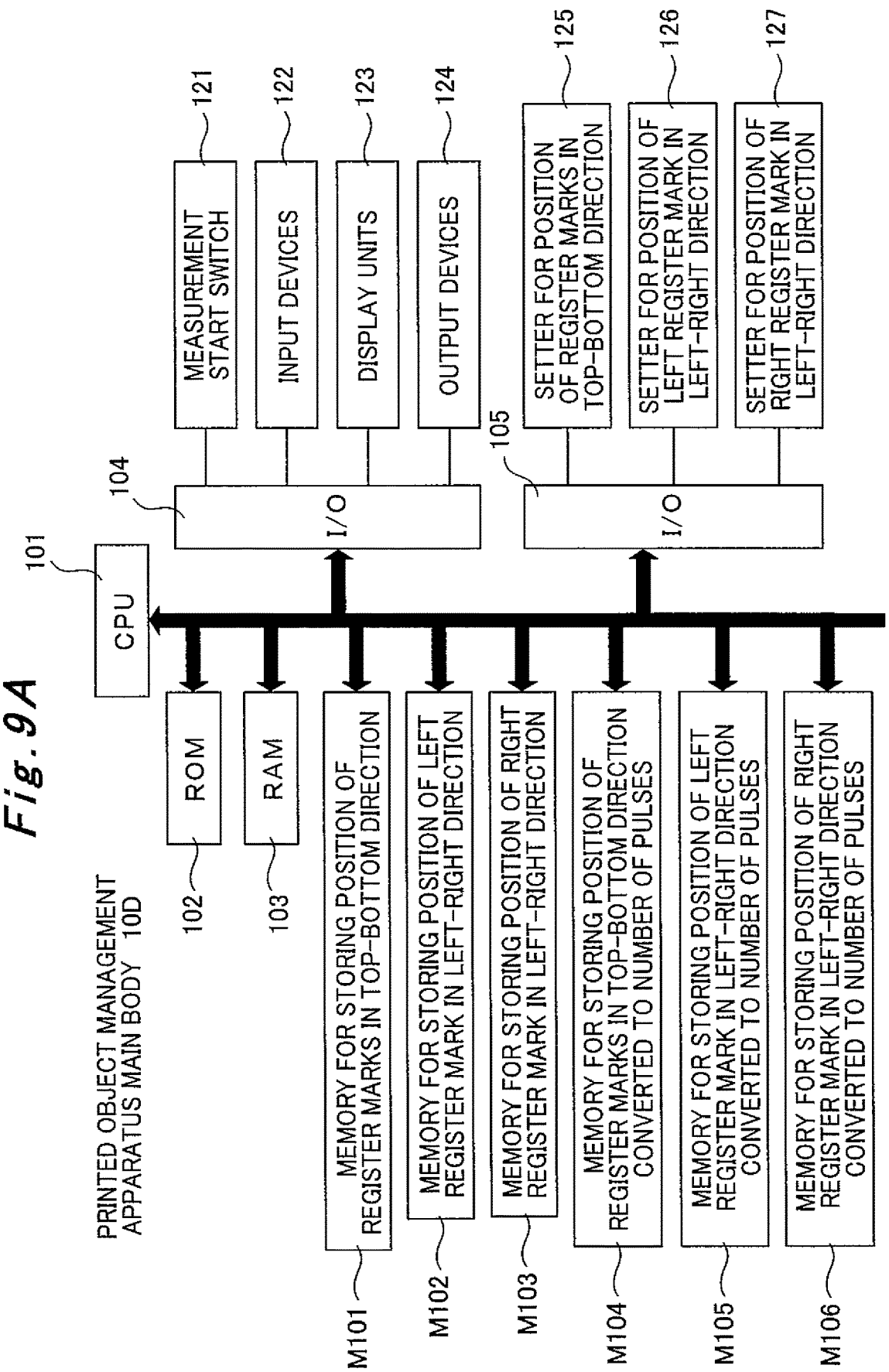
FIG. 9A is a block diagram illustrating a configuration of a printed object management apparatus main body according to one embodiment of the present invention.

As illustrated in FIGS. 9A to 9C, the printed object management apparatus main body 10D has a configuration in which a CPU 101, a ROM 102, a RAM 103, and input-output devices 104 to 115 are connected to one another by a BUS line.

A memory M101 for storing the position of the register marks in the top-bottom direction, a memory M102 for storing the position of the left register mark in the left-right direction, a memory M103 for storing the position of the right register mark in the left-right direction, a memory M104 for storing the position of the register marks in the top-bottom direction in terms of the number of pulses, a memory M105 for storing the position of the left register mark in the left-right direction in term of the number of pulses, and a memory M106 for storing the position of the right register mark in the left-right direction in terms of the number of pulses are connected to the BUS line.

Moreover, a memory M107 for storing a count value of a counter for detecting the position of (spectrophotometer+area camera) in the Y-axis direction, a memory M108 for storing the position of the control strip in the top-bottom direction, a count value X storing memory M109, a count value N storing memory M110, a memory M111 for storing a count value of a counter for detecting the position of the scanning head in the X-axis direction, a memory M112 for storing line sensor detection position, and a count value Y storing memory M113 are connected to the BUS line.

Furthermore, a memory M114 for storing captured-image data of the line sensors, a memory M115 for storing the number of pixels of the line sensors in the Y-axis direction, a memory M116 for storing a spectrophotometer measurement position, a memory M117 for storing color measurement data, a memory M118 for storing the density values of the color patches, a memory M119 for storing a right end position of the scanning head, a memory M120 for storing right captured-image data of the area camera, a memory M121 for storing the number of pixels of the area camera in the X-axis direction, a memory M122 for storing the number of pixels of the area camera in the Y-axis direction, a memory M123 for storing left captured-image data of the area camera, a memory M124 for storing a home position of the scanning head in the X-axis direction, and a memory M125 for storing a home position of (spectrophotometer+area camera) in the Y-axis direction are connected to the BUS line.

Moreover, a measurement start switch 121, input devices 122 such as a keyboard, various switches, and buttons, display units 123 such as a CRT display and lamps, output devices 124 such as a floppy (registered trademark) disk drive and a printer are connected to the input-output device 104.

A setter 125 for the position of the register marks in the top-bottom direction, a setter 126 for the position of the left register mark in the left-right direction, a setter 127 for the position of the right register mark in the left-right direction are connected to the input-output device 105.

The line sensors 11 are connected to the input-output devices 106 and 107. The line sensors 11 receive an image capturing instruction and a captured-image data transmission instruction from the input-output device 107 and output the captured-image data to the input-output device 106.

The spectrophotometer 12 is connected to the input-output devices 108 and 109. The spectrophotometer 12 receives a measurement instruction and a measurement data transmission instruction from the input-output device 109 and outputs the measurement data to the input-output device 108.

The area camera 13 is connected to the input-output devices 110 and 111. The area camera 13 receives an image capturing instruction and a captured-image data transmission instruction from the input-output device 111 and outputs captured-image data to the input-output device 110.

An X-axis drive motor driver 128 is connected to the input-output device 112. An X-axis drive motor 129 and an X-axis drive motor rotary encoder 130 are connected to the X-axis drive motor driver 128. The input-output device 112 outputs an instruction of forward rotation or reverse rotation to the X-axis drive motor driver 128.

A counter 131 for detecting the position of the scanning head in the X-axis direction is connected to the input-output device 113. The counter 131 for detecting the position of the scanning head in the X-axis direction is connected to the X-axis drive motor rotary encoder 130. The X-axis drive motor rotary encoder 130 is, for example, directly attached to a rear end portion of an output shaft of the X-axis drive motor 129 and outputs a clock pulse to the X-axis drive motor driver 128 and the counter 131 for detecting the position of the scanning head in the X-axis direction every time the X-axis drive motor 129 turns by a predetermined angle.

A Y-axis drive motor driver 132 is connected to the input-output device 114. A Y-axis drive motor 133 and a Y-axis drive motor rotary encoder 134 are connected to the Y-axis drive motor driver 132. The input-output device 114 outputs an instruction of forward rotation or reverse rotation to the Y-axis drive motor driver 132.

A counter 135 for detecting the position of (spectrophotometer+area camera) in the Y-axis direction is connected to the input-output device 115. The counter 135 for detecting the position of (spectrophotometer+area camera) in the Y-axis direction is connected to the Y-axis drive motor rotary encoder 134. The Y-axis drive motor rotary encoder 134 is, for example, directly attached to a rear end portion of an output shaft of the Y-axis drive motor 133 and outputs a clock pulse to the Y-axis drive motor driver 132 and the counter 135 for detecting the position of (spectrophotometer+area camera) in the Y-axis direction every time the Y-axis drive motor 133 turns by a predetermined angle.

The printed object management apparatus 10 configured as described above performs print quality inspection of inspecting the quality of the pattern printed on the printed object 9, performs color tone management of measuring the ink density of the printed pattern and controlling the ink supply amount such that the ink density becomes equal to the reference density, and performs inter-color registration of aligning the patterns of the respective colors with one another, as printed object management. A flow of the printed object management performed by the printed object management apparatus 10 is briefly described below by using FIG. 10.

Figure 10:
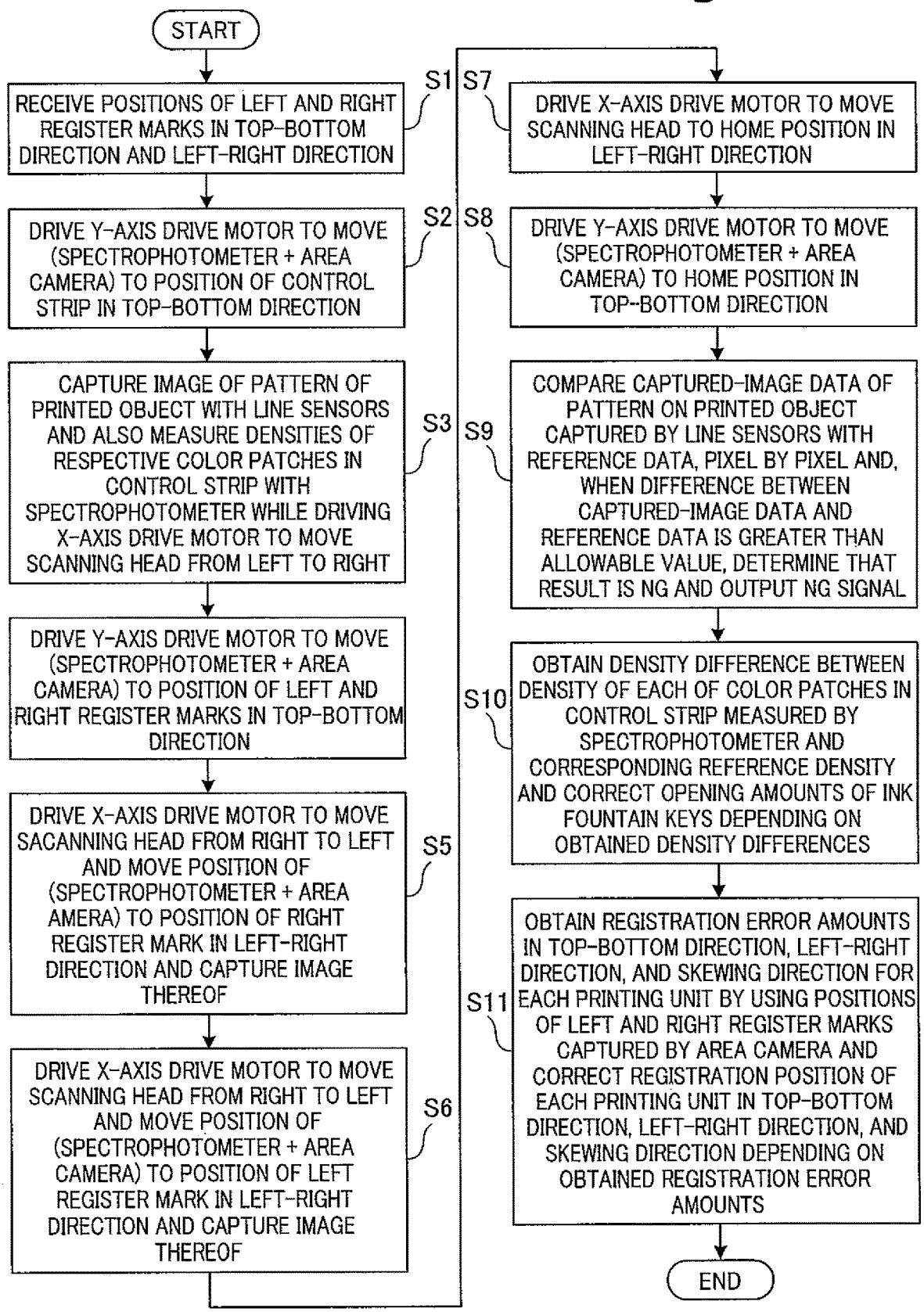
FIG. 10 is a flowchart illustrating schematic operations in a print object management method according to one embodiment of the present invention.
Figure 11A:
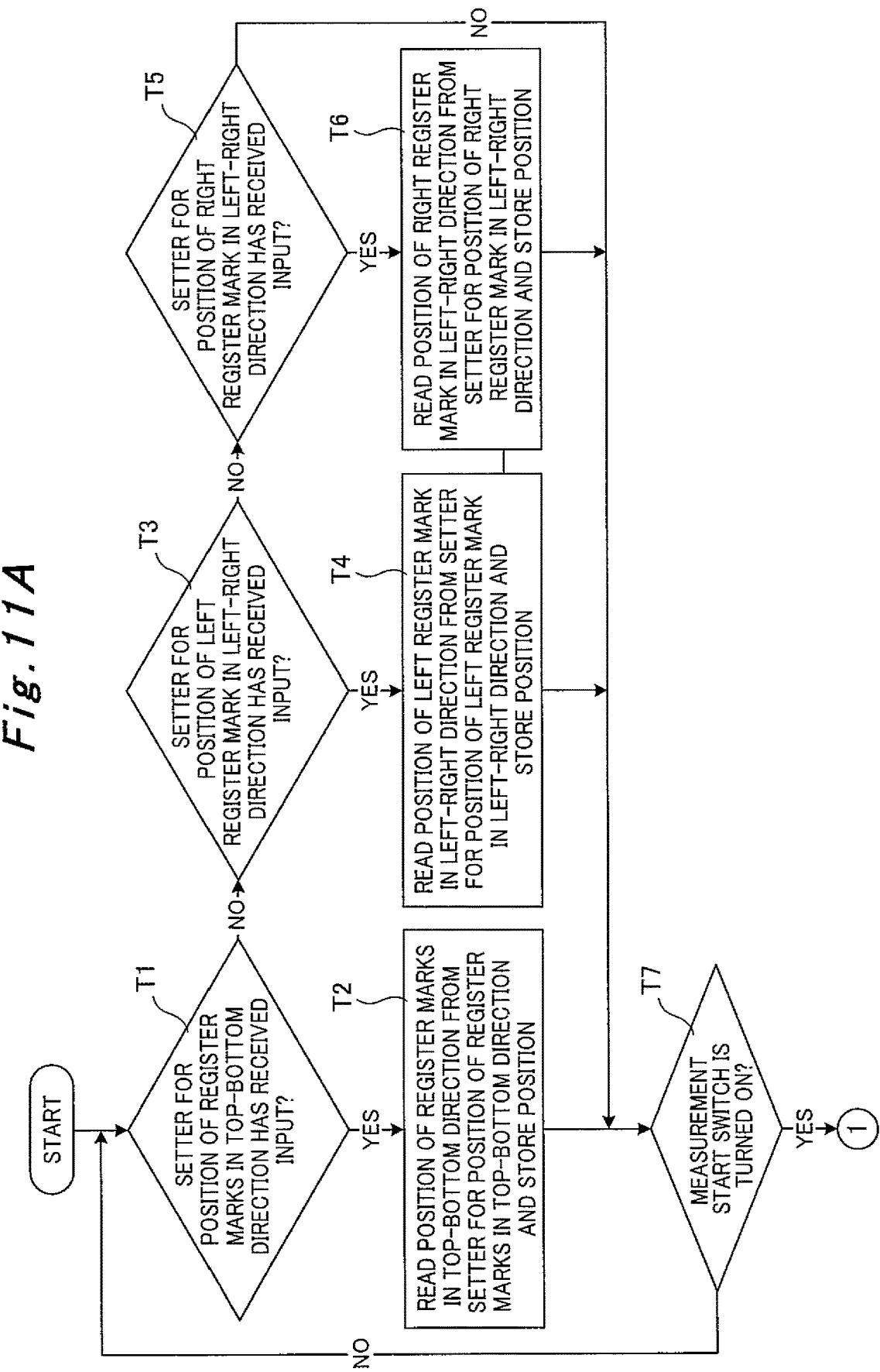
FIG. 11A is a flowchart illustrating a flow of processing performed by the printed object management apparatus main body according to one embodiment of the present invention.
Figure 11B:
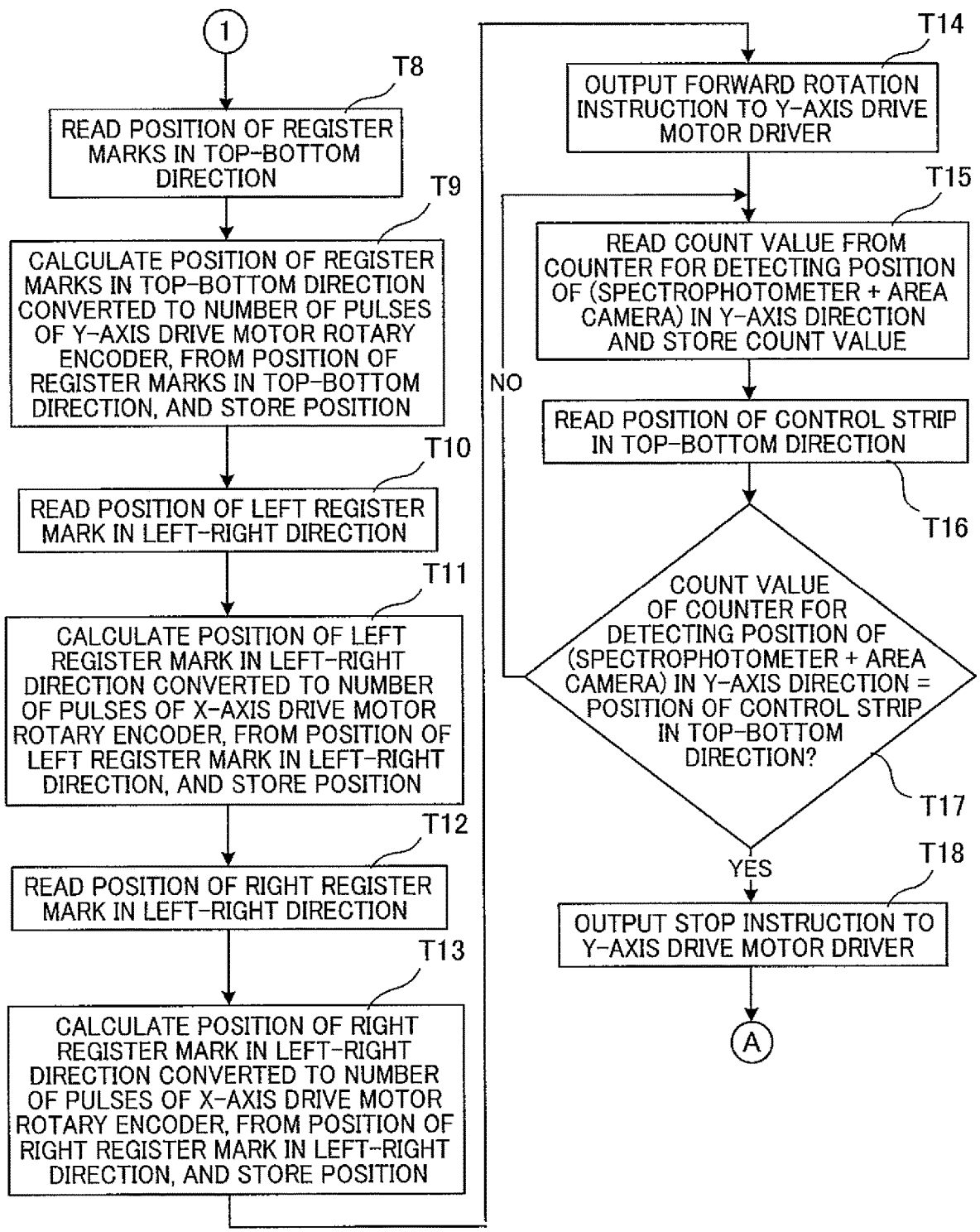
FIG. 11B is a flowchart illustrating the flow of processing performed by the printed object management apparatus main body according to one embodiment of the present invention.
Figure 12A:
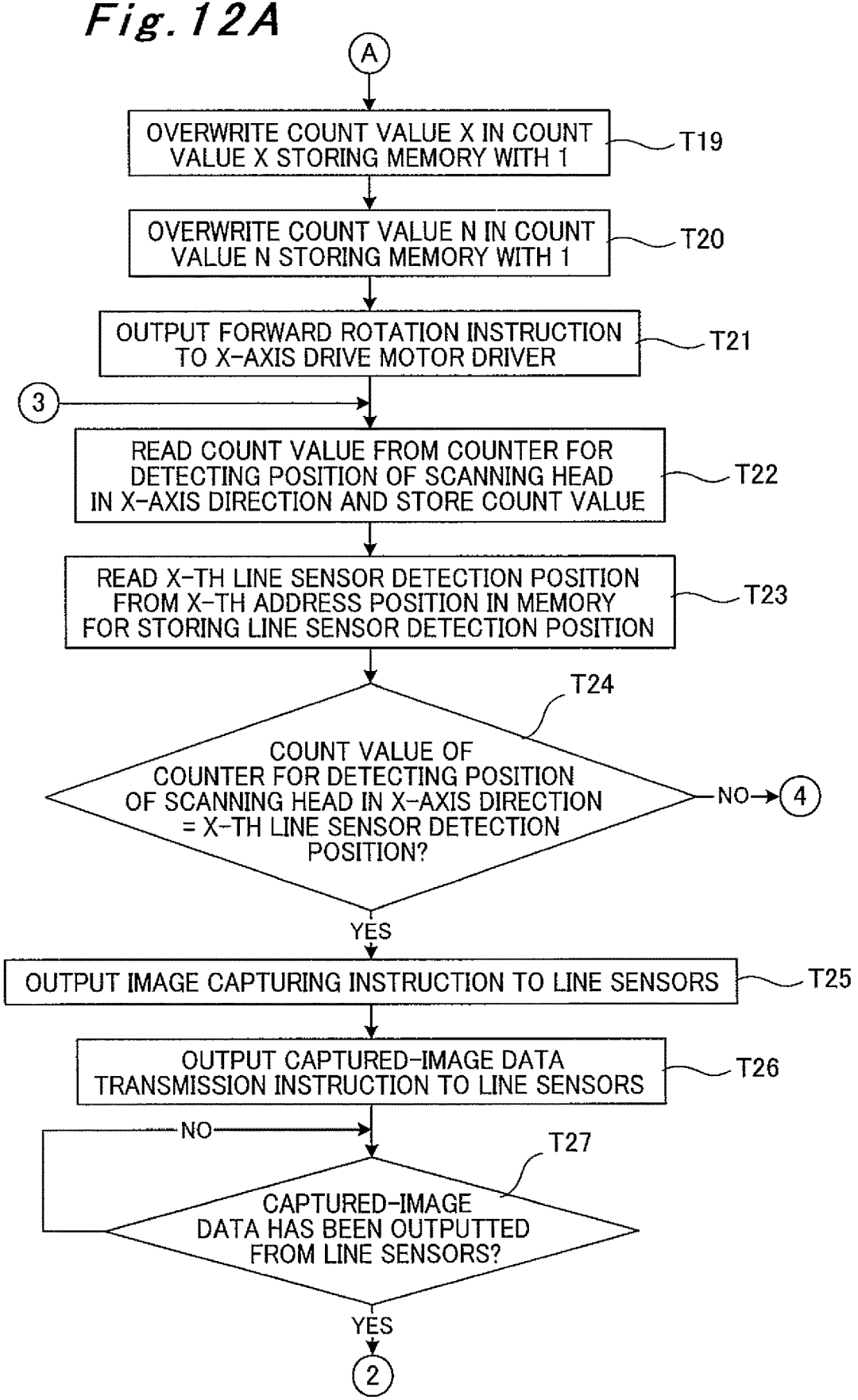
FIG. 12A is a flowchart illustrating the flow of processing performed by the printed object management apparatus main body according to one embodiment of the present invention.
Figure 12C:
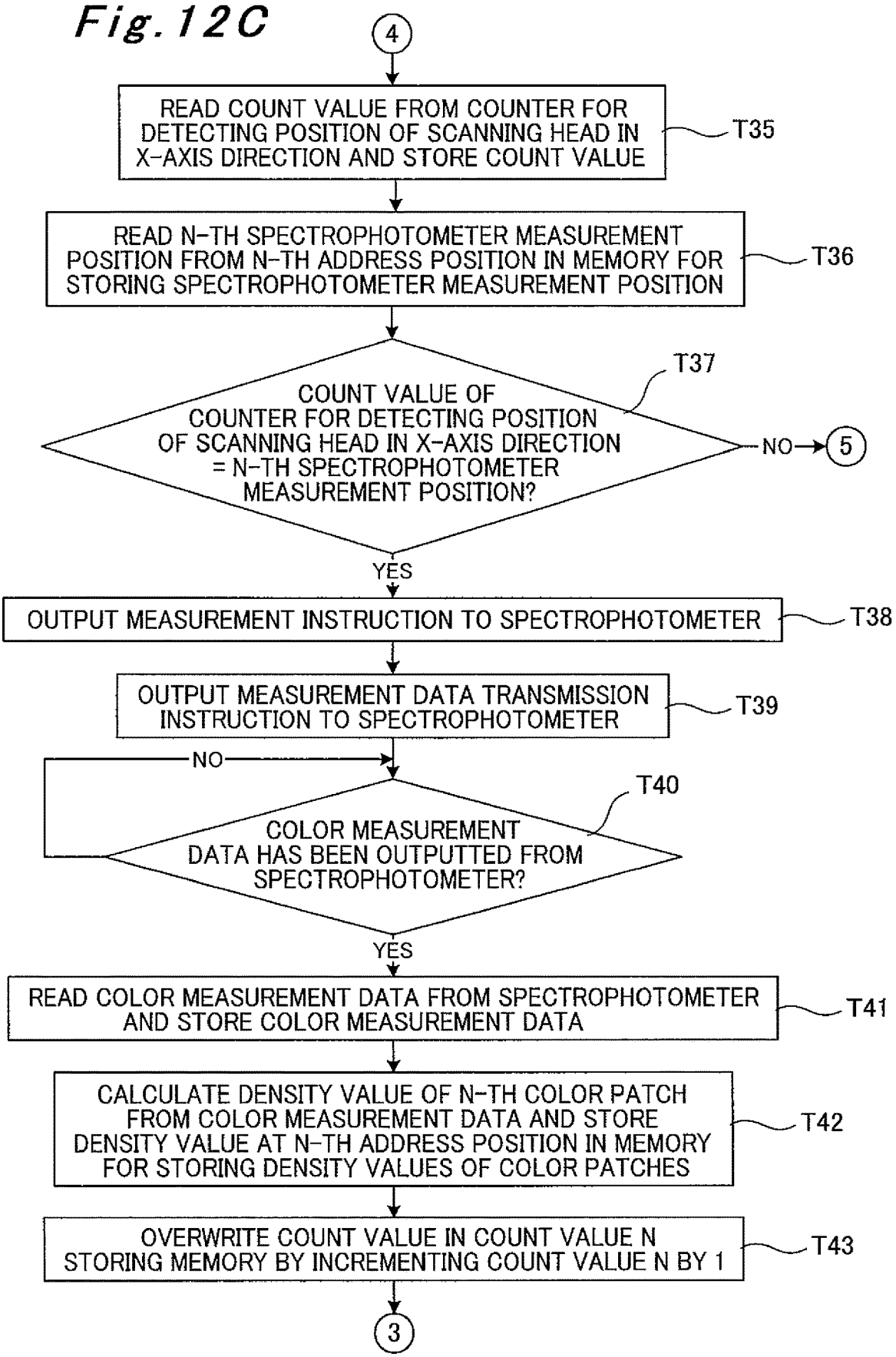
FIG. 12C is a flowchart illustrating the flow of processing performed by the printed object management apparatus main body according to one embodiment of the present invention.
Figure 12D:
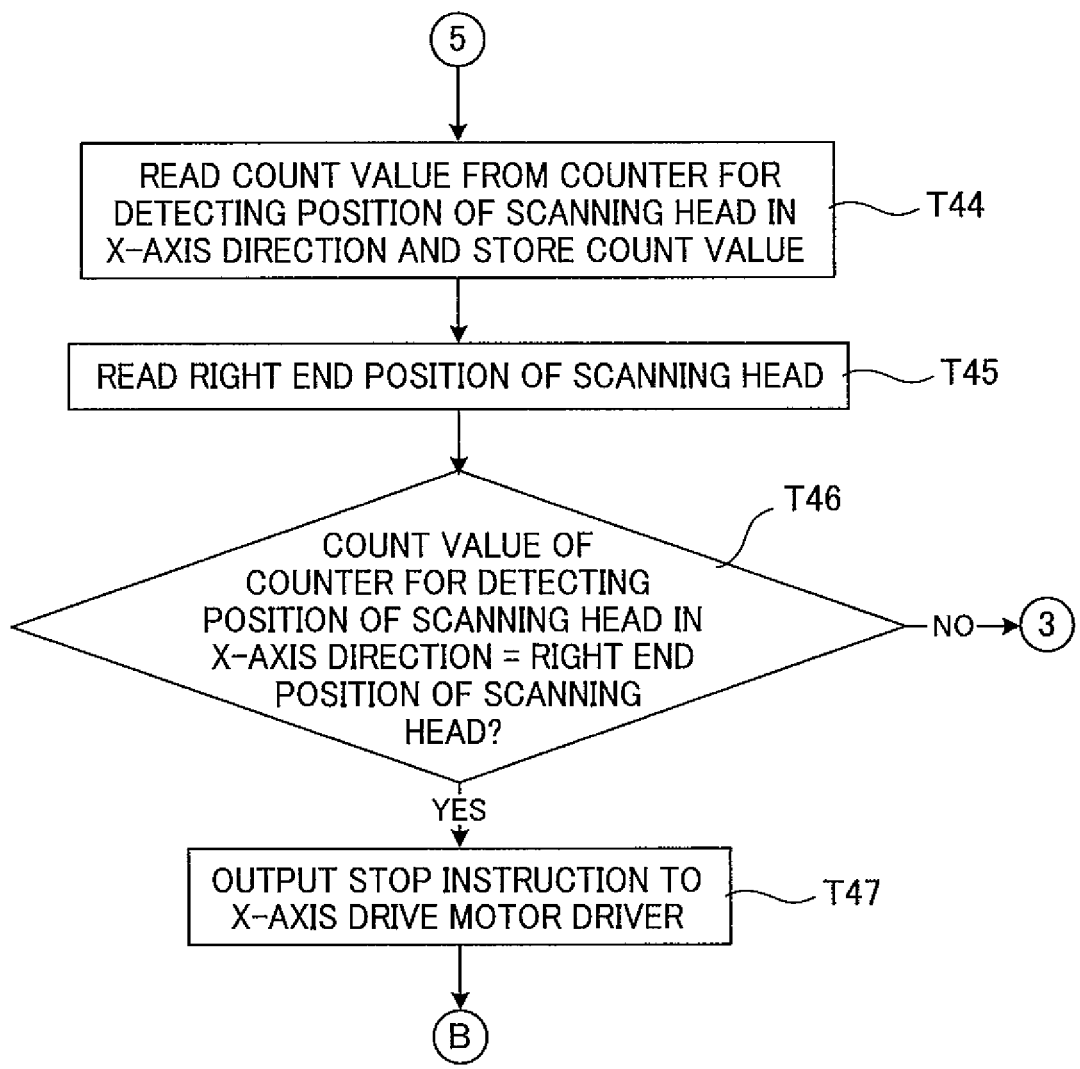
FIG. 12D is a flowchart illustrating the flow of processing performed by the printed object management apparatus main body according to one embodiment of the present invention.
Figure 13:
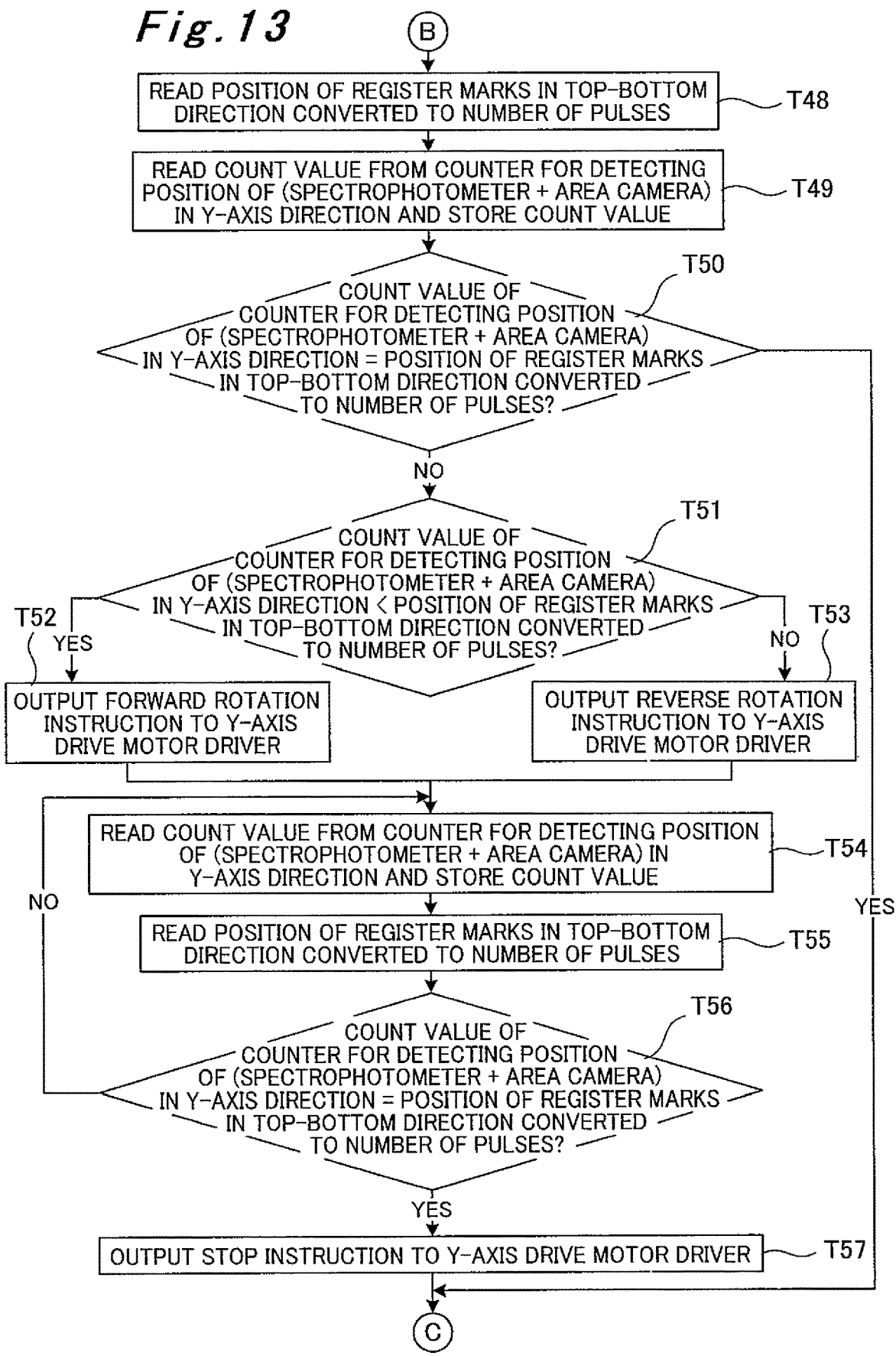
FIG. 13 is a flowchart illustrating the flow of processing performed by the printed object management apparatus main body according to one embodiment of the present invention.
Figure 14A:
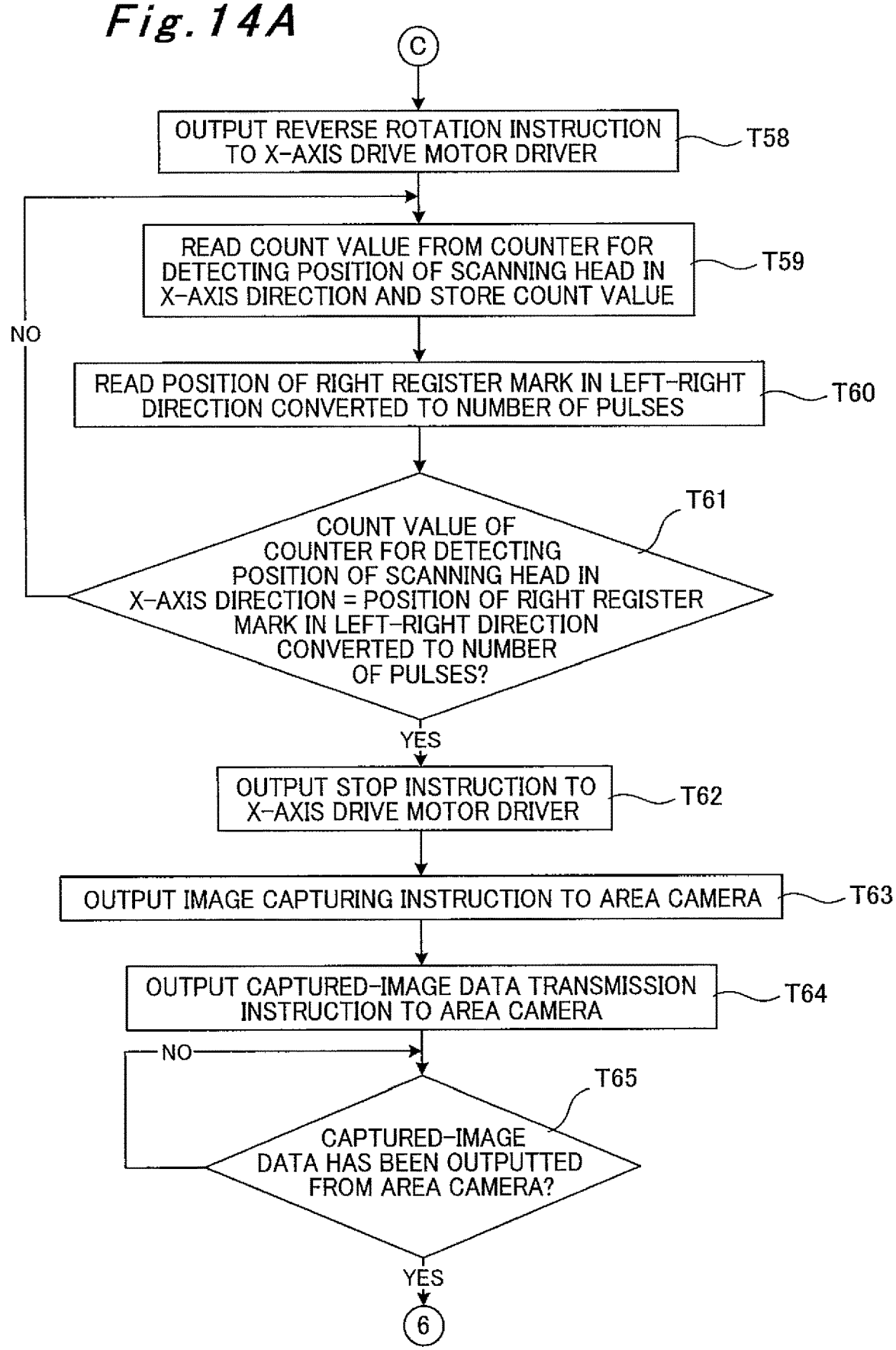
FIG. 14A is a flowchart illustrating the flow of processing performed by the printed object management apparatus main body according to one embodiment of the present invention.
Figure 14B:
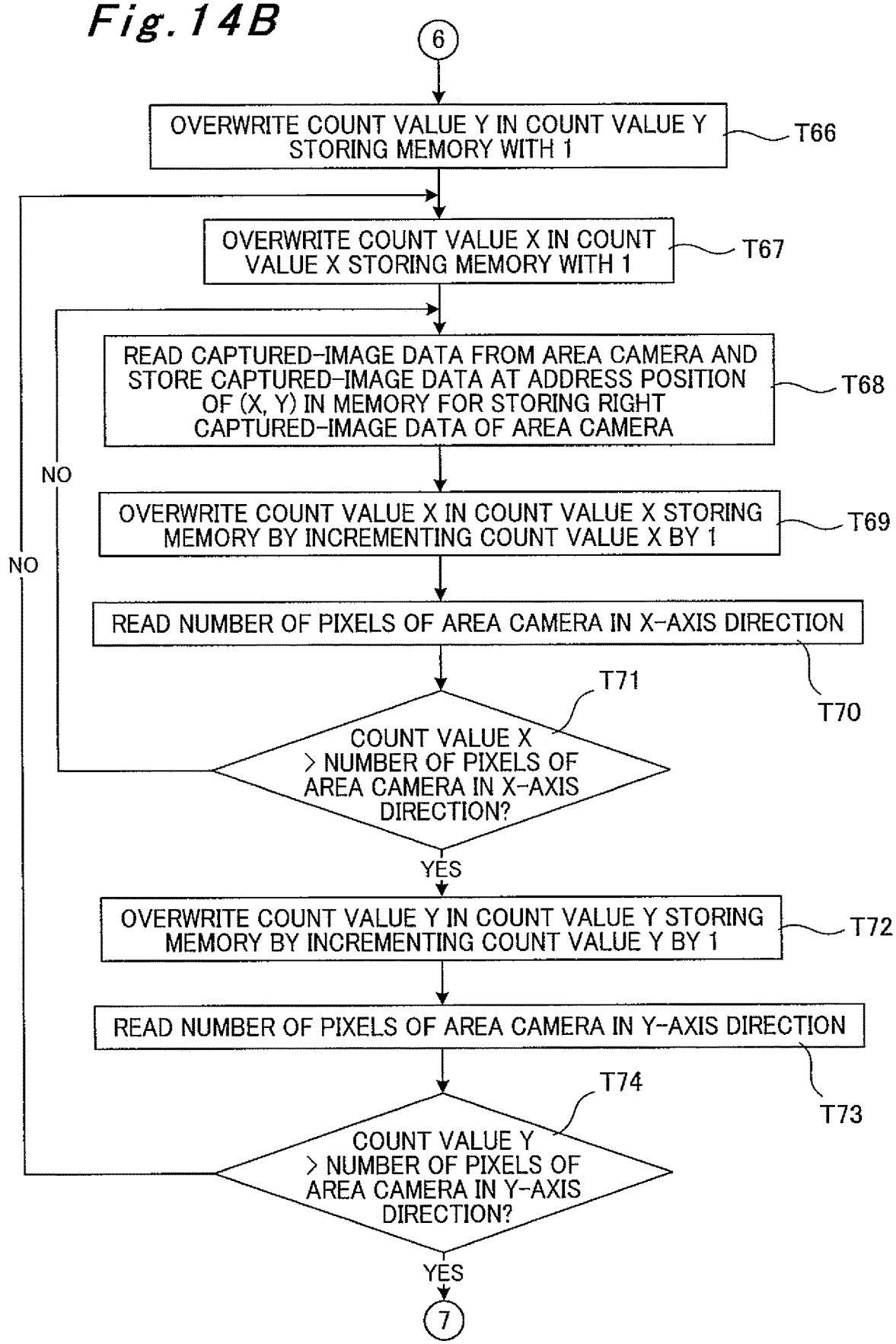
FIG. 14B is a flowchart illustrating the flow of processing performed by the printed object management apparatus main body according to one embodiment of the present invention.
Figure 14C:
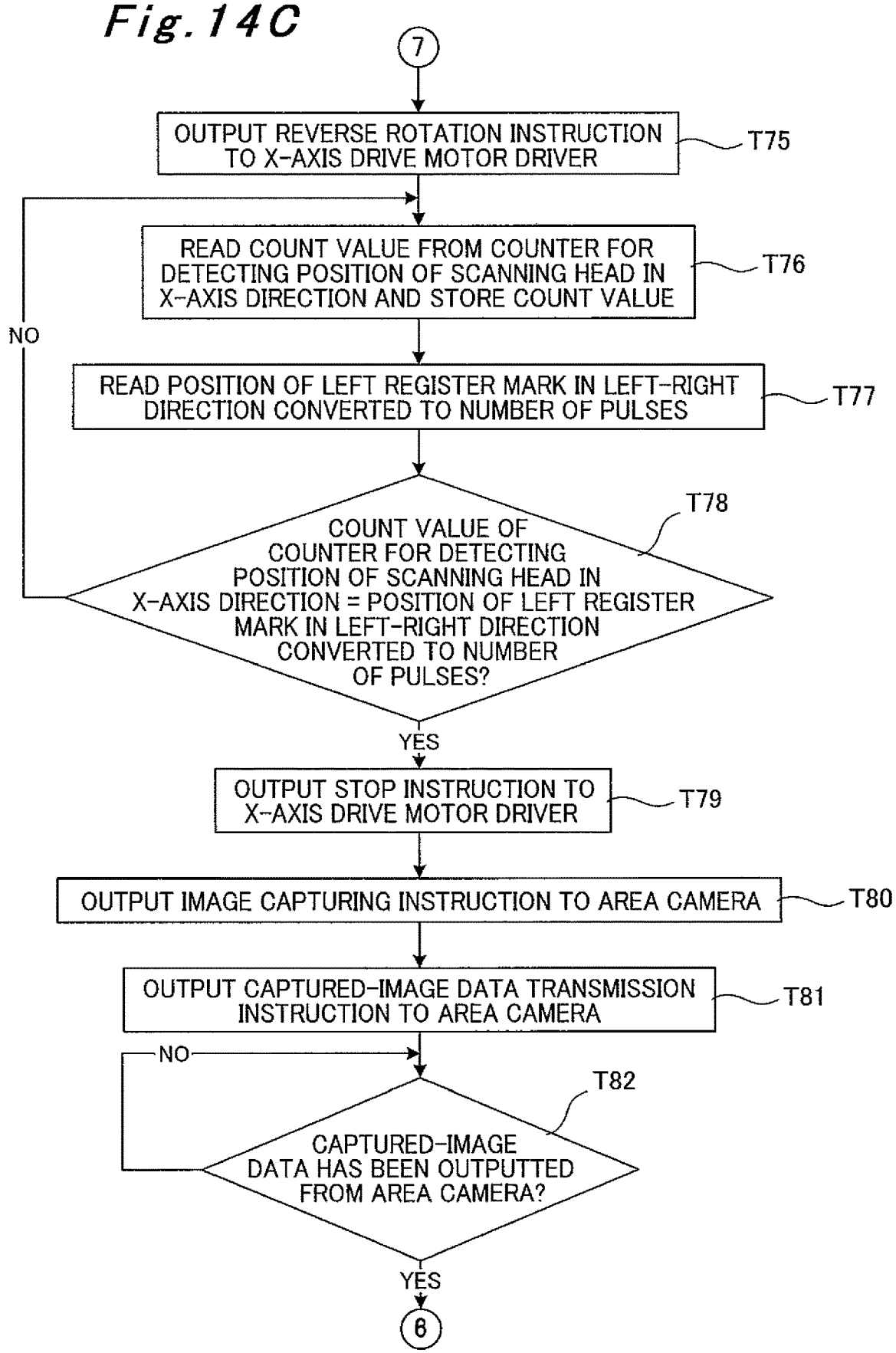
FIG. 14C is a flowchart illustrating the flow of processing performed by the printed object management apparatus main body according to one embodiment of the present invention.
Figure 14D:
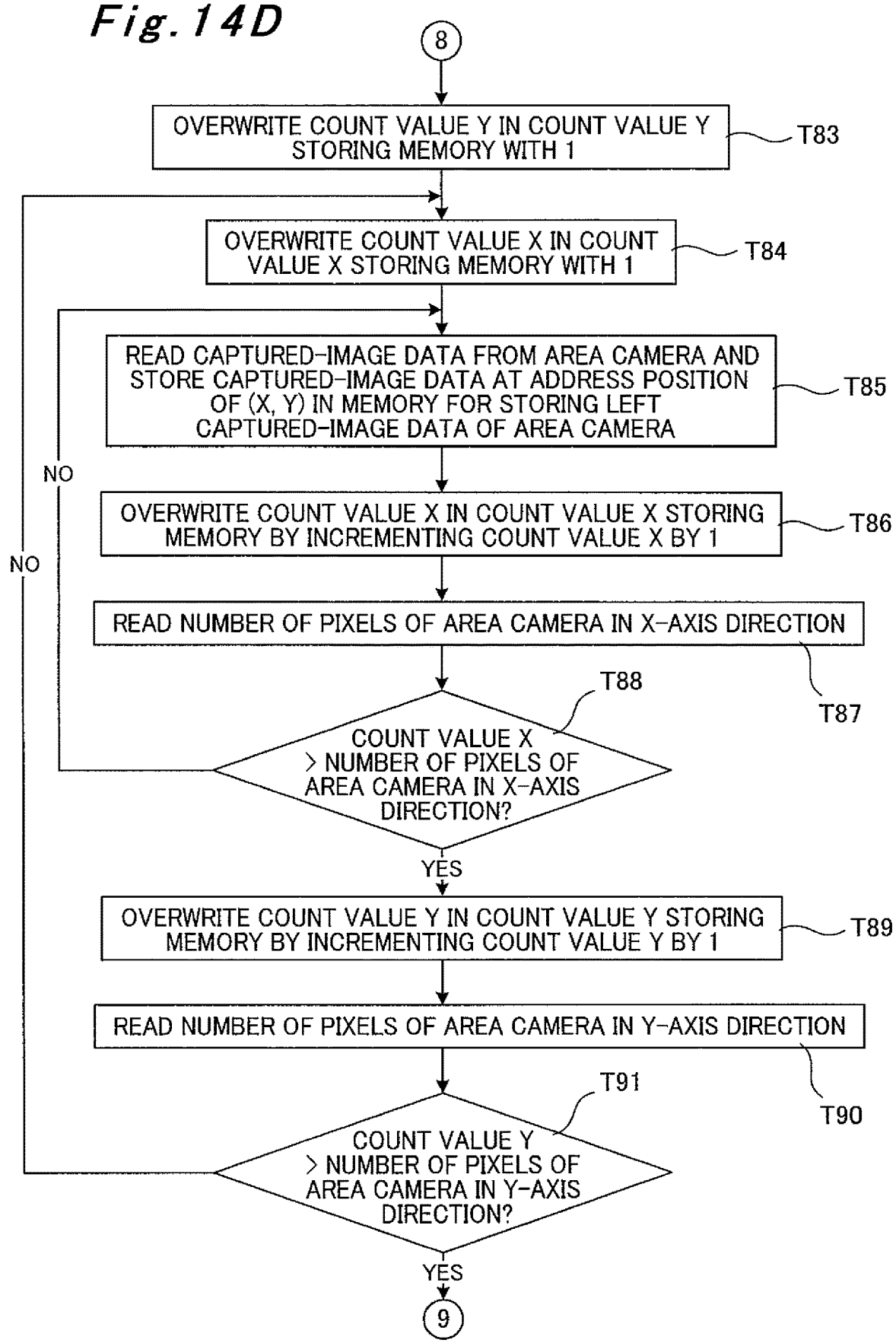
FIG. 14D is a flowchart illustrating the flow of processing performed by the printed object management apparatus main body according to one embodiment of the present invention.
Figure 14E:
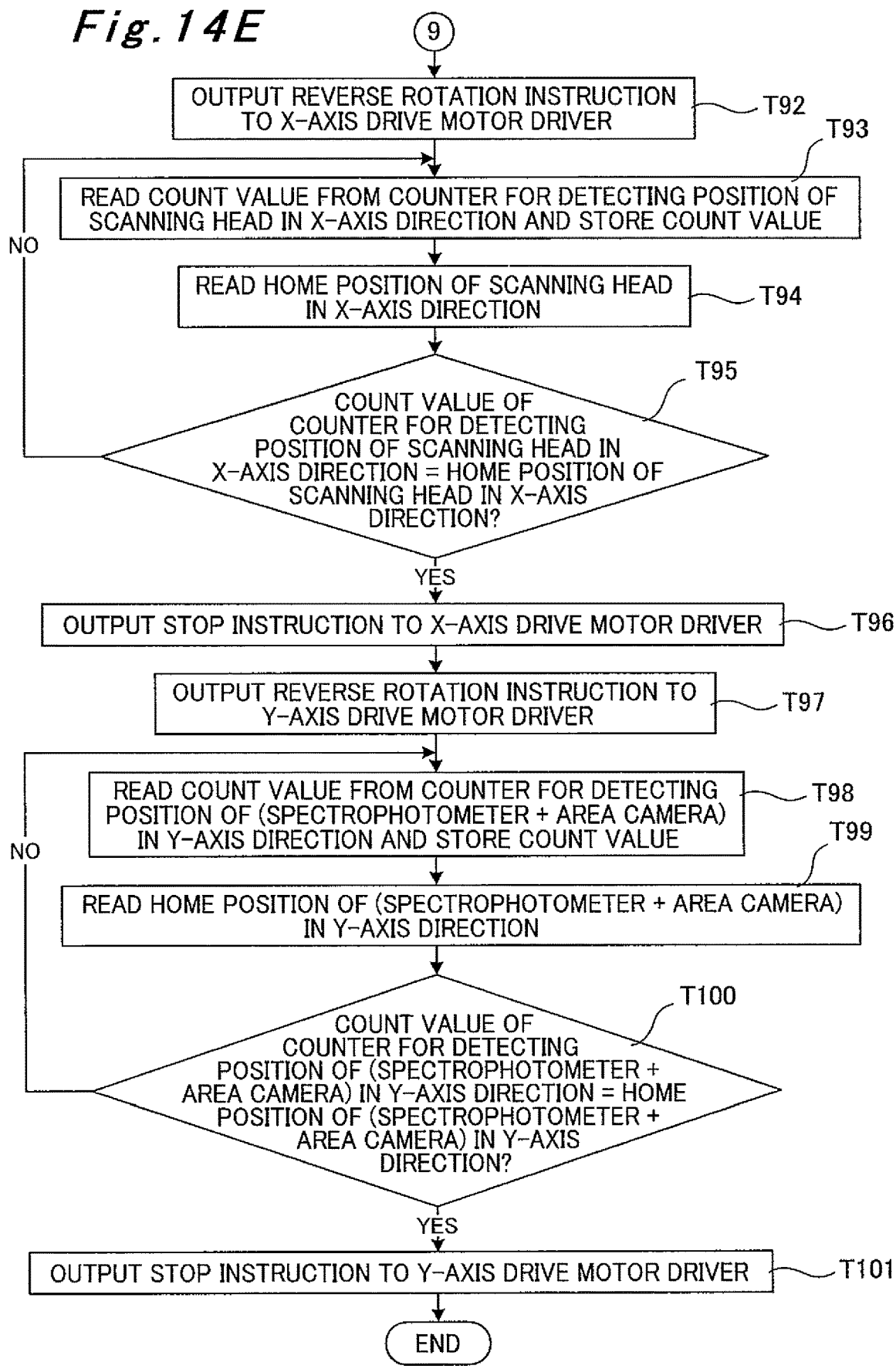
FIG. 14E is a flowchart illustrating the flow of processing performed by the printed object management apparatus main body according to one embodiment of the present invention.

As illustrated in FIG. 10, in step S1, the printed object management apparatus 10 first receives the positions of the left and right register marks 9c, 9d in the top-bottom direction and the left-right direction, then in step S2, drives the Y-axis drive motor 133 to move the spectrophotometer 12 and the area camera 13 to the position of the control strip 9*b* in the top-bottom direction, and, in step S3, captures an image of the pattern of the printed object with the line sensors 11 and also measures the densities of the respective color patches 9*b*L in the control strip 9*b* with the spectrophotometer 12 while driving the X-axis drive motor 129 to move the scanning head 10*b* from left to right.

Next, in step S4, the printed object management apparatus drives the Y-axis drive motor 133 to move the spectrophotometer 12 and the area camera 13 via the supporting body 10*c* to the position of the left and right register marks 9*c*, 9*d* in the top-bottom direction and, in step S5, drives the X-axis drive motor 129 to move the scanning head 10*b* from right to left and move the position of the spectrophotometer 12 and the area camera 13 in the left-right direction to the position of the right register mark 9*c* and captures an image thereof.

Then, in step S6, the printed object management apparatus 10 drives the X-axis drive motor 129 to move the scanning head 10*b* from right to left and move the position of the spectrophotometer 12 and the area camera 13 in the left-right direction to the position of the left register mark 9*d* and captures an image thereof, then in step S7, drives the X-axis drive motor 129 to move the scanning head 10*b* to the home position in the left-right direction, and, in step S8, drives the Y-axis drive motor 133 to move the spectrophotometer 12 and the area camera 13 via the supporting body 10*c* to the home position in the top-bottom direction.

Thereafter, in step S9, the printed object management apparatus 10 compares the captured-image data of the pattern on the printed object 9 captured by the line sensors 11 with reference data stored in advance, pixel by pixel. When a difference between the captured-image data and the reference data is greater than an allowable value, the printed object management apparatus 10 determines that the result is NG and outputs a NG signal.

Next, in step S10, the printed object management apparatus 10 obtains a density difference between the density of each of the color patches 9*b*L in the control strip 9*b* measured by the spectrophotometer 12 and a corresponding reference density set in advance and corrects opening amounts of the ink fountain keys 41 to 4M depending on the obtained density differences. Note that an already-known method is used for the correction of the opening amounts of the ink fountain keys 41 to 4M and detailed description thereof is omitted herein.

Then, in step S11, the printed object management apparatus 10 obtains registration error amounts in the top-bottom direction, the left-right direction, and a skewing direction for each of the printing units by using the positions (arrangement) of the left and right register marks 9*c*, 9*d* captured by the area camera 13 and corrects the registration position of each printing unit in the top-bottom direction, the left-right direction, and the skewing direction depending on the obtained registration error amounts. Note that the registration error amounts of the register marks 9*c*, 9*d* are obtained by comparing arrangement of reference register marks stored in advance with the arrangement of the left and right register marks 9*c*, 9*d* captured by the area camera 13. Moreover, an already-known method is used for the correction of the registration position of each printing unit in the top-bottom direction, the left-right direction, and the skewing direction and detailed description thereof is omitted herein.

Next, the processing performed by the printed object management apparatus main body 10D in aforementioned steps S1 to S8 illustrated in FIG. 10 is described in detail by using FIGS. 11A and 11B, 12A to 12D, 13, and 14A to 14E.

First, in step T1, the printed object management apparatus main body 10D determines whether the setter 125 for the position of the register marks in the top-bottom direction has received an input. When the setter 125 for the position of the register marks in the top-bottom direction has received an input (YES), in step T2, the printed object management apparatus main body 10D reads the position of the register marks 9*c*, 9*d* in the top-bottom direction from the setter 125 for the position of the register marks in the top-bottom direction to store the position in the memory M101 and the processing proceeds to step T7 to be described later.

When the setter 125 for the position of the register marks in the top-bottom direction receives no input in step T1 (NO), the processing proceeds to step T3.

In step T3, the printed object management apparatus main body 10D determines whether the setter 126 for the position of the left register mark in the left-right direction has received an input. When the setter 126 for the position of the left register mark in the left-right direction has received an input (YES), in step T4, the printed object management apparatus main body 10D reads the position of the left register mark 9*d* in the left-right direction from the setter 126 for the position of the left register mark in the left-right direction to store the position in the memory M102 and the processing proceeds to step T7 to be described later.

When the setter 126 for the position of the left register mark in the left-right direction receives no input in step T3 (NO), the processing proceeds to step 15.

In step T5, the printed object management apparatus main body 10D determines whether the setter 127 for the position of the right register mark in the left-right direction has received an input. When the setter 127 for the position of the right register mark in the left-right direction has received an input (YES), in step T6, the printed object management apparatus main body 10D reads the position of the right register mark 9*c* in the left-right direction from the setter 127 for the position of the right register mark in the left-right direction to store the position in the memory M103 and the processing proceeds to step T7 to be described later.

When the setter 127 for the position of the right register mark in the left-right direction receives no input in step T5 (NO), the processing proceeds to step T7.

In step T7, the printed object management apparatus main body 10D determines whether the measurement start switch 121 is turned ON. When the measurement start switch 121 is OFF (NO), the processing returns to step T1. When the measurement start switch 121 is turned ON (YES), the processing proceeds to step T8.

In step T8, the printed object management apparatus main body 10D reads the position of the register marks 9*c*, 9*d* in the top-bottom direction from the memory M101 and, then in step T9, calculates the position of the register marks 9*c*, 9*d* in the top-bottom direction in terms of the number of pulses of the Y-axis drive motor rotary encoder 134, from the position of the register marks 9*c*, 9*d* in the top-bottom direction, and stores the calculated position in the memory M104.

Then, in step T10, the printed object management apparatus main body 10D reads the position of the left register mark 9*d* in the left-right direction from the memory M102 and, in step T11, calculates the position of the left register mark 9*d* in the left-right direction in terms of the number of pulses of the X-axis drive motor rotary encoder 130, from the position of the left register mark 9d in the left-right direction, and stores the calculated position in the memory M105.

Next, in step T12, the printed object management apparatus main body 10D reads the position of the right register mark 9c in the left-right direction from the memory M103 and in step T13, calculates the position of the right register mark 9c in the left-right direction in terms of the number of pulses of the X-axis drive motor rotary encoder 130, from the position of the right register mark 9c in the left-right direction, and stores the calculated position in the memory M106.

In other words, steps T1 to T13 correspond to the processing in aforementioned step S1.

In step T14 subsequent to step T13, the printed object management apparatus main body 10D outputs the forward rotation instruction from the input-output device 114 to the Y-axis drive motor driver 132. The spectrophotometer 12 and the area camera 13 are thereby moved via the supporting body 10c from one side (bottom side) to the other side (top side) in the Y-axis direction in the scanning head 10b. Next, in step T15, the printed object management apparatus main body 10D reads a count value from the counter 135 for detecting the position of (spectrophotometer+area camera) in the Y-axis direction to store the read count value in the memory M107 and, in step T16, reads the position of the control strip 9b in the top-bottom direction from the memory M108.

Then, in step T17, the printed object management apparatus main body 10D determines whether the count value of the counter 135 for detecting the position of (spectrophotometer+area camera) in the Y-axis direction matches the position of the control strip 9b in the top-bottom direction. When the count value of the counter 135 for detecting the position of (spectrophotometer+area camera) in the Y-axis direction is different from the position of the control strip 9b in the top-bottom direction (NO), the processing returns to step T15. When the count value of the counter 135 for detecting the position of (spectrophotometer+area camera) in the Y-axis direction matches the position of the control strip 9b in the top-bottom direction (YES), in step T18, the printed object management apparatus main body 10D outputs a stop instruction from the input-output device 114 to the Y-axis drive motor driver 132.

In other words, steps T14 to T18 correspond to the processing of aforementioned step S2.

In step T19 subsequent to step T18, the printed object management apparatus main body 10D overwrites the count value X in the count value X storing memory M109 with 1, in step T20, overwrites the count value N in the count value N storing memory M110 with 1, and, in step T21, outputs the forward rotation instruction from the input-output device 112 to the X-axis drive motor driver 128. The scanning head 10b is thereby moved from one side (left side) to the other side (right side) in the X-axis direction.

Next, in step T22, the printed object management apparatus main body 10D reads a count value from the counter 131 for detecting the position of the scanning head in the X-axis direction and stores the read count value in the memory M111 and, in step T23, reads the X-th line sensor detection position from the X-th address position in the memory M112 for storing the line sensor detection position.

Then, in step T24, the printed object management apparatus main body 10D determines whether the count value of the counter 131 for detecting the position of the scanning head in the X-axis direction matches the X-th line sensor detection position. When the count value of the counter 131 for detecting the position of the scanning head in the X-axis direction is different from the X-th line sensor detection position (NO), the processing proceeds to step T35 to be described later. When the count value of the counter 131 for detecting the position of the scanning head in the X-axis direction matches the X-th line sensor detection position (YES), the processing proceeds to step T25.

In step T25, the printed object management apparatus main body 10D outputs the image capturing instruction from the input-output device 107 to the line sensors 11 and, then in step T26, outputs the captured-image data transmission instruction from the input-output device 107 to the line sensors 11.

Next, in step T27, the printed object management apparatus main body 10D determines whether the captured-image data has been outputted from the line sensors 11 to the input-output device 106. When no captured-image data has been outputted from the line sensors 11 to the input-output device 106 (NO), the processing of step T27 is repeated. When the captured-image data has been outputted from the line sensors 11 to the input-output device 106 (YES), the processing proceeds to step T28.

In step T28, the printed object management apparatus main body 10D reads the count value X from the memory M109, then in step T29, overwrites the count value Y in the count value Y storing memory M113 with 1, and, in step T30, reads the captured-image data from the line sensors 11 to store the read captured-image data at an address position of (X, Y) in the memory M114 for storing the captured-image data of the line sensors.

Then, in step T31, the printed object management apparatus main body 10D overwrites the count value Y in the count value Y storing memory M113 by incrementing the count value Y by 1 and, in step T32, reads the number of pixels of the line sensors 11 in the Y-axis direction from the memory M115.

Next, in step T33, the printed object management apparatus main body 10D determines whether the count value Y exceeds the number of pixels of the line sensors 11 in the Y-axis direction. When the count value Y is equal to or less than the number of pixels of the line sensors 11 in the Y-axis direction (NO), the processing returns to step T30. When the count value Y exceeds the number of pixels of the line sensors 11 in the Y-axis direction (YES), in step T34, the printed object management apparatus main body 10D overwrites the count value X in the count value X storing memory M109 by incrementing the count value X by 1 and the processing returns to step T22.

Moreover, when the processing proceeds from step T24 to step T35, in step T35, the printed object management apparatus main body 10D reads the count value from the counter 131 for detecting the position of the scanning head in the X-axis direction to store the read count value in the memory M111 and, then in step T36, reads the N-th spectrophotometer measurement position from the N-th address position in the memory M116 for storing the spectrophotometer measurement position.

Next, in step T37, the printed object management apparatus main body 10D determines whether the count value of the counter 131 for detecting the position of the scanning head in the X-axis direction matches the N-th spectrophotometer measurement position. When the count value of the counter 131 for detecting the position of the scanning head in the X-axis direction is different from the N-th spectrophotometer measurement position (NO), the processing proceeds to step T44 to be described later. When the count value of the counter 131 for detecting the position of the scanning head in the X-axis direction matches the N-th spectrophotometer measurement position (YES), the processing proceeds to step T38.

In step T38, the printed object management apparatus main body 10D outputs the measurement instruction from the input-output device 109 to the spectrophotometer 12 and, then in step T39, outputs the measurement data transmission instruction from the input-output device 109 to the spectrophotometer 12.

Next, in step T40, the printed object management apparatus main body 10D determines whether the color measurement data has been outputted from the spectrophotometer 12 to the input-output device 108. When no color measurement data has been outputted from the spectrophotometer 12 to the input-output device 108 (NO), the processing of step T40 is repeated. When the color measurement data has been outputted from the spectrophotometer 12 to the input-output device 108 (YES), the processing proceeds to step T41.

In step T41, the printed object management apparatus main body 10D reads the color measurement data from the spectrophotometer 12 to store the read color measurement data in the memory M117, then in step T42, calculates the density value of the N-th color patch 9bN from the color measurement data and stores the density value at the N-th address position in the memory M118 for storing the density values of the color patches, and, in step T43, overwrites the count value N in the count value N storing memory M110 by incrementing the count value N by 1. Then, the processing returns to step T22.

Moreover, when the processing proceeds from step T37 to step T44, in step T44, the printed object management apparatus main body 10D reads the count value from the counter 131 for detecting the position of the scanning head in the X-axis direction to store the read count value in the memory M111 and, then in step T45, reads a right end position of the scanning head 10b from the memory M119.

Next, in step T46, the printed object management apparatus main body 10D determines whether the count value of the counter 131 for detecting the position of the scanning head in the X-axis direction matches the right end position of the scanning head 10b. When the count value of the counter 131 for detecting the position of the scanning head in the X-axis direction is different from the right end position of the scanning head 10b (NO), the processing returns to step T22. When the count value of the counter 131 for detecting the position of the scanning head in the X-axis direction matches the right end position of the scanning head 10b (YES), in step T47, the printed object management apparatus main body 10D outputs a stop instruction from the input-output device 112 to the X-axis drive motor driver 128.

In other words, steps T19 to T47 correspond to the processing of aforementioned step S3.

In step T48 subsequent to step T47, the printed object management apparatus main body 10D reads the position of the register marks 9c, 9d in the top-bottom direction in terms of the number of pulses, from the memory M104 and, then in step T49, reads the count value of the counter 135 for detecting the position of (spectrophotometer+area camera) in the Y-axis direction to store the read count value in the memory M107.

Then, in step T50, the printed object management apparatus main body 10D determines whether the count value of the counter 135 for detecting the position of (spectrophotometer+area camera) in the Y-axis direction matches the position of the register marks 9c, 9d in the top-bottom direction in terms of the number of pulses. When the count value of the counter 135 for detecting the position of (spectrophotometer+area camera) in the Y-axis direction matches the position of the register marks 9c, 9d in the top-bottom direction in terms of the number of pulses (YES), the processing proceeds to step T58 to be described later. When the count value of the counter 135 for detecting the position of (spectrophotometer+area camera) in the Y-axis direction is different from the position of the register marks 9c, 9d in the top-bottom direction in terms of the number of pulses (NO), the processing proceeds to step T51.

In step T51, the printed object management apparatus main body 10D determines whether the count value of the counter 135 for detecting the position of (spectrophotometer+area camera) in the Y-axis direction is less than the position of the register marks 9c, 9d in the top-bottom direction in terms of the number of pulses. When the count value of the counter 135 for detecting the position of (spectrophotometer+area camera) in the Y-axis direction is less than the position of the register marks 9c, 9d in the top-bottom direction in terms of the number of pulses (YES), in step T52, the printed object management apparatus main body 10D outputs the forward rotation instruction from the input-output device 114 to the Y-axis drive motor driver 132. When the count value of the counter 135 for detecting the position of (spectrophotometer+area camera) in the Y-axis direction is equal to or more than the position of the register marks 9c, 9d in the top-bottom direction in terms of the number of pulses (NO), in step T53, the printed object management apparatus main body 10D outputs the reverse rotation instruction from the input-output device 114 to the Y-axis drive motor driver 132. The spectrophotometer 12 and the area camera 13 are thereby moved via the supporting body 10c toward the position of the register marks 9c, 9d in the top-bottom direction in the scanning head 10b.

In step T54 subsequent to step S52 or S53, the printed object management apparatus main body 10D reads the count value from the counter 135 for detecting the position of (spectrophotometer+area camera) in the Y-axis direction to store the read count value in the memory M107 and, then in step T55, reads the position of the register marks 9c, 9d in the top-bottom direction in terms of the number of pulses, from the memory M104.

Next, in step T56, the printed object management apparatus main body 10D determines whether the count value of the counter 135 for detecting the position of (spectrophotometer+area camera) in the Y-axis direction matches the position of the register marks 9c, 9d in the top-bottom direction in terms of the number of pulses. When the count value of the counter 135 for detecting the position of (spectrophotometer+area camera) in the Y-axis direction is different from the position of the register marks 9c, 9d in the top-bottom direction in terms of the number of pulses (NO), the processing returns to step T54. When the count value of the counter 135 for detecting the position of (spectrophotometer+area camera) in the Y-axis direction matches the position of the register marks 9c, 9d in the top-bottom direction in terms of the number of pulses (YES), in step T57, the printed object management apparatus main body 10D outputs the stop instruction from the input-output device 114 to the Y-axis drive motor driver 132.

In other words, steps T48 to T57 correspond to the processing of aforementioned step S4.

In step T58 subsequent to step T57, the printed object management apparatus main body 10D outputs the reverse rotation instruction from the input-output device 112 to the X-axis drive motor driver 128. The scanning head 10*b* is thereby moved from the other side to the one side in the X-axis direction. Next, in step T59, the printed object management apparatus main body 10D reads the count value from the counter 131 for detecting the position of the scanning head in the X-axis direction to store the read count value in the memory M111 and, in step T60, reads the position of the right register mark 9*c* in the left-right direction in terms of the number of pulses, from the memory M106.

Then, in step T61, the printed object management apparatus main body 10D determines whether the count value of the counter 131 for detecting the position of the scanning head in the X-axis direction matches the position of the right register mark 9*c* in the left-right direction in terms of the number of pulses. When the count value of the counter 131 for detecting the position of the scanning head in the X-axis direction is different from the position of the right register mark 9*c* in the left-right direction in terms of the number of pulses (NO), the processing returns to step T59. When the count value of the counter 131 for detecting the position of the scanning head in the X-axis direction matches the position of the right register mark 9*c* in the left-right direction in terms of the number of pulses (YES), the processing proceeds to step T62.

In step T62, the printed object management apparatus main body 10D outputs the stop instruction from the input-output device 112 to the X-axis drive motor driver 128, then in step T63, outputs the image capturing instruction from the input-output device 111 to the area camera 13, and, in step T64, outputs the captured-image data transmission instruction from the input-output device 111 to the area camera 13.

Next, in step T65, the printed object management apparatus main body 10D determines whether the captured-image data has been outputted from the area camera 13 to the input-output device 110. When no captured-image data has been outputted from the area camera 13 to the input-output device 110 (NO), the processing of step T65 is repeated. When the captured-image data has been outputted from the area camera 13 to the input-output device 110 (YES), the processing proceeds to step T66.

In step T66, the printed object management apparatus main body 10D overwrites the count value Y in the count value Y storing memory M113 with 1, then in step T67, overwrites the count value X in the count value X storing memory M109 with 1, and, in step T68, reads the captured-image data from the area camera 13 to store the captured-image data at the address position of (X, Y) in the memory M120 for storing the right captured-image data of the area camera.

Next, in step T69, the printed object management apparatus main body 10D overwrites the count value X in the count value X storing memory M109 by incrementing the count value X by 1 and, in step T70, reads the number of pixels of the area camera 13 in the X-axis direction from the memory M121.

Then, in step T71, the printed object management apparatus main body 10D determines whether the count value X exceeds the number of pixels of the area camera 13 in the X-axis direction. When the count value X is equal to or less than the number of pixels of the area camera 13 in the X-axis direction (NO), the processing returns to step T68. When the count value X exceeds the number of pixels of the area camera 13 in the X-axis direction (YES), the processing proceeds to step T72.

In step T72, the printed object management apparatus main body 10D overwrites the count value Y in the count value Y storing memory M113 by incrementing the count value Y by 1 and, then in step T73, reads the number of pixels of the area camera 13 in the Y-axis direction from the memory M122.

Next in step T74, the printed object management apparatus main body 10D determines whether the count value Y exceeds the number of pixels of the area camera 13 in the Y-axis direction. When the count value Y is equal to or less than the number of pixels of the area camera 13 in the Y-axis direction (NO), the processing returns to step T67. When the count value Y exceeds the number of pixels of the area camera 13 in the Y-axis direction (YES), the processing proceeds to step T75.

In other words, steps T58 to T74 correspond to the processing of aforementioned step S5.

In step T75, the printed object management apparatus main body 10D outputs the reverse rotation instruction from the input-output device 112 to the X-axis drive motor driver 128. The scanning head 10*b* is thereby moved from the other side to the one side in the X-axis direction. Then, in step T76, the printed object management apparatus main body 10D reads the count value from the counter 131 for detecting the position of the scanning head in the X-axis direction to store the read count value in the memory M111 and, in step T77, reads the position of the left register mark 9*d* in the left-right direction in terms of the number of pulses, from the memory M105.

Next, in step T78, the printed object management apparatus main body 10D determines whether the count value of the counter 131 for detecting the position of the scanning head in the X-axis direction matches the position of the left register mark 9*d* in the left-right direction in terms of the number of pulses. When the count value of the counter 131 for detecting the position of the scanning head in the X-axis direction is different from the position of the left register mark 9*d* in the left-right direction in terms of the number of pulses (NO), the processing returns to step T76. When the count value of the counter 131 for detecting the position of the scanning head in the X-axis direction matches the position of the left register mark 9*d* in the left-right direction in terms of the number of pulses (YES), the processing proceeds to step T79.

In step T79, the printed object management apparatus main body 10D outputs the stop instruction from the input-output device 112 to the X-axis drive motor driver 128, then in step T80, outputs the image capturing instruction from the input-output device 111 to the area camera 13, and, in step T81, outputs the captured-image data transmission instruction from the input-output device 111 to the area camera 13.

Then, in step T82, the printed object management apparatus main body 10D determines whether the captured-image data has been outputted from the area camera 13 to the input-output device 110. When no captured-image data has been outputted from the area camera 13 to the input-output device 110 (NO), the processing of step T82 is repeated. When the captured-image data has been outputted from the area camera 13 to the input-output device 110 (YES), the processing proceeds to step T83.

In step T83, the printed object management apparatus main body 10D overwrites the count value Y in the count value Y storing memory M113 with 1, then in step T84, overwrites the count value X in the count value X storing memory M109 with 1, and, in step T85, reads the captured-image data from the area camera 13 to store the captured-image data at the address position of (X, Y) in the memory M123 for storing the left captured-image data of the area camera.

Next, in step T86, the printed object management apparatus main body 10D overwrites the count value X in the count value X storing memory M109 by incrementing the count value X by 1 and, in step T87, reads the number of pixels of the area camera 13 in the X-axis direction from the memory M121.

Then, in step T88, the printed object management apparatus main body 10D determines whether the count value X exceeds the number of pixels of the area camera 13 in the X-axis direction. When the count value X is equal to or less than the number of pixels of the area camera 13 in the X-axis direction (NO), the processing returns to step T85. When the count value X exceeds the number of pixels of the area camera 13 in the X-axis direction (YES), the processing proceeds to step T89.

In step T89, the printed object management apparatus main body 10D overwrites the count value Y in the count value Y storing memory M113 by incrementing the count value Y by 1 and, then in step T90, reads the number of pixels of the area camera 13 in the Y-axis direction from the memory M122.

Next, in step T91, the printed object management apparatus main body 10D determines whether the count value Y exceeds the number of pixels of the area camera 13 in the Y-axis direction. When the count value Y is equal to or less than the number of pixels of the area camera 13 in the Y-axis direction (NO), the processing returns to step T84. When the count value Y exceeds the number of pixels of the area camera 13 in the Y-axis direction (YES), the processing proceeds to step T92.

In other words, steps T75 to T91 correspond to the processing of aforementioned step S6.

In step T92, the printed object management apparatus main body 10D outputs the reverse rotation instruction from the input-output device 112 to the X-axis drive motor driver 128. The scanning head 10b thereby moves from the other side to the one side in the X-axis direction. Next, in step T93, the printed object management apparatus main body 10D reads the count value from the counter 131 for detecting the position of the scanning head in the X-axis direction to store the read count value in the memory M111 and, in step T94, reads the home position of the scanning head 10b in the X-axis direction from the memory M124.

Next, in step T95, the printed object management apparatus main body 10D determines whether the count value of the counter 131 for detecting the position of the scanning head in the X-axis direction matches the home position of the scanning head 10b in the X-axis direction. When the count value of the counter 131 for detecting the position of the scanning head in the X-axis direction is different from the home position of the scanning head 10b in the X-axis direction (NO), the processing returns to step T93. When the count value of the counter 131 for detecting the position of the scanning head in the X-axis direction matches the home position of the scanning head 10b in the X-axis direction (YES), the processing proceeds to step T96. In step T96, the printed object management apparatus main body 10D outputs the stop instruction from the input-output device 112 to the X-axis drive motor driver 128.

In other words, steps T92 to T96 correspond to the processing of aforementioned step S7.

In step T97 subsequent to step T96, the printed object management apparatus main body 10D outputs the reverse rotation instruction from the input-output device 114 to the Y-axis drive motor driver 132. The spectrophotometer 12 and the area camera 13 are thereby moved via the supporting body 10c from the other side to the one side in the Y-axis direction in the scanning head 10b. Then, in step T98, the printed object management apparatus main body 10D reads the count value from the counter 135 for detecting the position of (spectrophotometer+area camera) in the Y-axis direction to store the read count value in the memory M107 and, in step T99, reads the home position of (spectrophotometer 12+area camera 13) in the Y-axis direction from the memory M125.

Then, in step T100, the printed object management apparatus main body 10D determines whether the count value of the counter 135 for detecting the position of (spectrophotometer+area camera) in the Y-axis direction matches the home position of (spectrophotometer 12+area camera 13) in the Y-axis direction. When the count value of the counter 135 for detecting the position of (spectrophotometer+area camera) in the Y-axis direction is different from the home position of (spectrophotometer 12+area camera 13) in the Y-axis direction (NO), the processing returns to step T98. When the count value of the counter 135 for detecting the position of (spectrophotometer+area camera) in the Y-axis direction matches the home position of (spectrophotometer 12+area camera 13) in the Y-axis direction (YES), in step T101, the printed object management apparatus main body 10D outputs the stop instruction from the input-output device 114 to the Y-axis drive motor driver 132 and terminates the processing.

In other words, steps T97 to T101 correspond to the processing of aforementioned step S8.

According to the printed object management apparatus and management method according to the embodiment configured as described above, the line sensors 11 used for the print quality inspection, the spectrophotometer 12 used for the print density control, and the area camera 13 used for the inter-color registration are supported on one scanning head 10b. This enables the print quality inspection, the color tone management, and the inter-color registration to be performed with high accuracy with the equipment cost being suppressed.

Moreover, the scanning head 10b is configured to be movable in the X-axis direction (left-right direction) and the line sensors 11 are fixed to the scanning head 10b while the spectrophotometer 12 and the area camera 13 are configured to be movable in the Y-axis direction (top-bottom direction) in the scanning head 10b. This enables all detection and measurement for the print quality inspection, the print density control, and the inter-color registration to be performed by reciprocating the scanning head 10b on the printed object 9 in the left-right direction such that, when the scanning head 10b is moved from the one end side to the other end side in the X-axis direction, the line sensors 11 detect all patterns and the spectrophotometer 12 measures the print density and, when the scanning head 10b is moved back from the other end side to the one end side in the X-axis direction, the area camera 13 detects the register marks. The management of the printed object 9 can be thus performed in the minimal movement distance, that is, in the minimal time.

Note that, although the example in which the spectrophotometer 12 and the area camera 13 are integrally supported on the supporting body 10c is described in the aforementioned embodiment, the present invention is not limited to the aforementioned embodiment and the arrangement of the spectrophotometer 13 and the area camera 13 may be changed as necessary.

Moreover, although the example in which the three line sensors 11 are provided along the Y-axis direction is described in the aforementioned embodiment, as many line sensors 11 as needed may be provided and the number of line sensors 11 may be one, two, or four or more. Furthermore, the arrangement of the line sensors 11 and the set of the spectrophotometer 13 and the area camera 12 may be reversed in the left-right direction.

Furthermore, in the aforementioned embodiment, there is described the example in which, when the scanning head 10*b* is moved from the one end side to the other end side in the X-axis direction, the line sensors 11 detect all patterns and the spectrophotometer 12 measures the print density and, when the scanning head 10*b* is moved back from the other end side to the one end side in the X-axis direction, the area camera 13 detects the register marks. However, the configuration may be such that, for example, when the scanning head 10*b* is moved from the one end side to the other end side in the X-axis direction, the area camera 13 detects the register marks and, when the scanning head 10*b* is moved back from the other end side to the one end side in the X-axis direction, the line sensors 11 detect all patterns and the spectrophotometer 12 measures the print density.

INDUSTRIAL APPLICABILITY

The present invention can be utilized in the printed object management apparatus and management method.

EXPLANATION OF THE REFERENCE NUMERALS

1 ink fountain
2 ink
3 ink fountain roller
4 (41~4M) ink fountain key
5 ink doctor roller
6 ink roller group
7 printing plate
8 plate cylinder
9 printed object
9*a* pattern region
9*b* control strip
9*b*L color patch of control strip
9*c*, 9*d* register mark
10 printed object management apparatus
10A print quality-inspecting unit
10B print density controlling unit
10C inter-color registering unit
10D printed object management apparatus main body
10*a* stage
10*b* scanning unit
10*c* supporting body
10*d* X-axis drive mechanism
10*e* Y-axis drive mechanism
10*f*, 10*g* roller
11 line sensor
12 spectrophotometer
13 area camera
14-11 to 14-4M ink fountain key controlling device
15-1 to 15-4 registration adjusting device
101 CPU
102 ROM
103 RAM
104 to 115 input-output device
121 measurement start switch
122 input device
123 display unit
124 output device
125 setter for position of register marks in top-bottom direction
126 setter for position of left register mark in left-right direction
127 setter for position of right register mark in left-right direction
128 X-axis drive motor driver
129 X-axis drive motor
130 X-axis drive motor rotary encoder
131 counter for detecting position of scanning head in X-axis direction
132 Y-axis drive motor driver
133 Y-axis drive motor
134 Y-axis drive motor rotary encoder
135 counter for detecting position of (spectrophotometer+ area camera) in Y-axis direction
M101 to M125 memory

The invention claimed is:

1. A printed object management apparatus, comprising:
    a first detector configured to detect an overall pattern of a printed object;
    a density measuring detector configured to measure an ink density of the printed object;
    a second detector configured to detect a register mark of the printed object;
    a print quality-inspector configured to inspect quality of the overall pattern of the printed object based on data received from the first detector;
    a print density controller configured to control an ink supply amount based on data received from the density measuring detector such that the ink density becomes equal to a reference density; and
    an inter-color registrator configured to align patterns of various colors with one another based on data received from the second detector, wherein
    the first detector, the density measuring detector, and the second detector are supported on one scanning head, and
    the first detector is fixedly supported on the scanning head, and
    the printed object management apparatus further comprises:
        a first driver configured to move the scanning head in a left-right direction;
        a supporting body supporting the density measuring detector and the second detector; and
        a second driver configured to move the supporting body in a top-bottom direction in the scanning head,
    the printed object management apparatus further comprising:
        a controller configured to control the first driver, the second driver, the first detector, the density measuring detector, and the second detector such that, when the scanning head is moved from one side to the other side in the left-right direction, the first detector detects the overall pattern of the printed object and the density measuring detector measures the ink density of the printed object and, when the scanning head is moved back from the other side to the one side in the left-right direction, the second detector detects the register mark.

2. A printed object management method, comprising:
    print quality inspection processing of inspecting quality of an overall pattern of a printed object based on data received from a first detector configured to detect the overall pattern of the printed object;
    print density control processing of controlling an ink supply amount based on data received from a measuring device configured to measure an ink density of the printed object such that the ink density becomes equal to a reference density; and inter-color registration processing of aligning patterns of various colors with one another based on data received from a second detector configured to detect a register mark of the printed object, wherein the printed object management method further comprising:

supporting the first detector, the measuring device, and the second detector on one scanning head;

fixedly supporting the first detector on the scanning head;

moving the scanning head in a left-right direction by a first driving device, supporting the measuring device and the second detector by a supporting body, and moving the supporting body in a top-bottom direction in the scanning head by a second driving device, and wherein the first driving device, the second driving device, the first detector, the measuring device, and the second detector are controlled such that, when the scanning head is moved from one side to the other side in the left-right direction, the first detector detects the overall pattern of the printed object and the measuring device measures the ink density of the printed object and, when the scanning head is moved back from the other side to the one side in the left-right direction, the second detector detects the register mark.

* * * * *